(12) United States Patent
Minter

(10) Patent No.: US 7,961,955 B1
(45) Date of Patent: *Jun. 14, 2011

(54) ADAPTIVE BAYES FEATURE EXTRACTION

(76) Inventor: Thomas Cecil Minter, Coldspring, TX (US)

( * ) Notice: Subject to any disclaimer, the term of this patent is extended or adjusted under 35 U.S.C. 154(b) by 763 days.

This patent is subject to a terminal disclaimer.

(21) Appl. No.: 12/011,518

(22) Filed: Jan. 28, 2008

(51) Int. Cl.
*G06K 9/62* (2006.01)

(52) U.S. Cl. .................... 382/224; 706/12; 382/159

(58) Field of Classification Search .............. 382/224
See application file for complete search history.

(56) References Cited

U.S. PATENT DOCUMENTS

| | | | |
|---|---|---|---|
| 5,325,445 A | 6/1994 | Herbert | |
| 5,479,523 A | 12/1995 | Gaborski | |
| 5,555,320 A | 9/1996 | Irie | |
| 5,671,293 A | 9/1997 | Niki | |
| 5,819,007 A | 10/1998 | Elghazzawi | |
| 5,920,644 A | 7/1999 | Fujimoto | |
| 6,058,206 A | 5/2000 | Kortge | |
| 6,137,909 A | 10/2000 | Greineder | |
| 6,609,093 B1 | 8/2003 | Gopinath | |
| 6,628,834 B2 | 9/2003 | Gotsman | |
| 6,671,404 B1 | 12/2003 | Kawatani | |
| 6,778,701 B1 | 8/2004 | Okajima | |
| 6,832,069 B2 * | 12/2004 | Stout et al. ................ | 434/353 |
| 6,857,112 B1 * | 2/2005 | Teig et al. ................ | 716/115 |
| 6,883,148 B1 * | 4/2005 | Teig et al. ................ | 716/115 |
| 6,910,025 B2 * | 6/2005 | Cao .......................... | 706/15 |
| 6,993,193 B2 | 1/2006 | Smith | |
| 7,010,167 B1 | 3/2006 | Ordowski | |
| 7,076,098 B2 | 7/2006 | Ishikawa | |
| 7,085,426 B2 * | 8/2006 | August ..................... | 382/260 |
| 7,174,040 B2 | 2/2007 | Lienhart | |
| 7,593,851 B2 * | 9/2009 | Yang ........................ | 704/228 |
| 7,706,610 B2 * | 4/2010 | Zhang et al. ............ | 382/173 |
| 2003/0118246 A1 * | 6/2003 | August .................... | 382/260 |
| 2005/0123893 A1 * | 6/2005 | Stout et al. ............. | 434/353 |
| 2008/0015793 A1 * | 1/2008 | Ben-Menahem et al. ... | 702/30 |
| 2009/0057395 A1 * | 3/2009 | He et al. .................. | 235/379 |

OTHER PUBLICATIONS

Belcher, W. M. and Minter, T. C., "Selecting Class Weights to Minimize Classification Bias in Acreage Estimation" (1976). LARS Symposia. Paper 133. http://docs.lib.purdue.edu/lars_symp/133.*

Havens, K. A.; Minter, T. C.; and Thadani, S. G., "Estimation of the Probability of Error without Ground Truth and Known A Priori Probabilities" (1976). LARS Symposia. Paper 134. http://docs.lib.purdue.edu/lars_symp/134.*

Lin, G. C. and Minter, T. C., "Bayes Estimation on Parameters of the Single-Class Classifier" (1976). LARS Symposia. Paper 135. http://docs.lib.purdue.edu/lars_symp/135.*

(Continued)

*Primary Examiner* — Sath V. Perungavoor

(57) ABSTRACT

A system and method for extracting "discriminately informative features" from input patterns which provide accurate discrimination between two classes, a class-of-interest and a class-other, while reducing the number of features under the condition where training samples or otherwise, are provided a priori only for the class-of-interest thus eliminating the requirement for any a priori knowledge of the other classes in the input-data-set while exploiting the potentially robust and powerful feature extraction capability provided by fully supervised feature extraction approaches. The system and method extracts discriminate features by exploiting the ability of the adaptive Bayes classifier to define an optimal Bayes decision boundary between the class-of-interest and class-other using only labeled samples from the class-of-interest and unlabeled samples from the data to be classified. Optimal features are derived from vectors normal to the decision boundary defined by the adaptive Bayes classifier.

27 Claims, 23 Drawing Sheets

OTHER PUBLICATIONS

Minter, T. C., "Single-Class Classification" (1975). LARS Symposia. Paper 54. http://docs.lib.purdue.edu/lars_symp/54.*
G. F. Hughes, "On the Mean Accuracy of Statistical pattern Recognizers," IEEE Trans. Info. Theory, vol. IT-14, No. 1 (1968): pp. 55-63.
K. Fukunaga, "Effects of sample size in classifier design," IEEE Trans. Pattern Anal. Machine Intell., vol. 11, Aug. 1989, pp. 873-885.
A. K. Jain, R. W. Duin, and J. Mao, "Statistical Pattern Recognition: A Review", IEEE Trans. on Pattern Analysis and Machine Intelligence, vol. 22, No. 1, Jan. 2000, pp. 4-37.
R.O. Duda and P.E. Hart, Pattern Classification and Scene Analysis, New York: John Wiley & Sons, 1973.
T. C. Minter, "A Discriminant Procedure for Target Recognition in Imagery Data", Proc. of the IEEE 1980 National Aerospace and Electronic Conference—NAECON 1980, May 1980.
B. Gorte and N. Gorte-Kroupnova, "Non-parametric classification algorithm with an unknown class", Proc. of the Intnl Symposium on Computer Vision, 1995, pp. 443-448.
P. Mantero, "Partially supervised classification of remote sensing images using SVM-based probability density estimation", IEEE Trans. on Geo. and Remote Sensing, Mar. 2005.
A. Guerrero-Curieses, A Biasiotto, S.B. Serpico, and G. Moser, "Supervised Classification of Remote Sensing Images with Unknown Classes," Proc. of IGARSS-2002, Jun. 2002.
K. Fukunaga,et al "Bayes Error Estimation Using Parzen and k-NN Procedures", IEEE Trans. on PAMI, vol. PAMI-9, No. 5, No. 5, Sep. 1987, p. 634-643.
E. Fix et al, "Discriminatory analysis, nonparametric discrimination," U. S. Air Force School of Aviation Medicine, Randolph Field, Tex Project 21-49-004, Rep. 4, Feb. 1951.
M. Rosenblatt, "Remarks on some nonparametric estimates of a density function," Ann. Math. Statist., vol. 27, pp. 832-837, 1956.
P. Whittle, "On the smoothing of probability density functions," J. Roy. Statist., Ser B, vol. 20, pp. 334-343, 1958.
T. Cacoullos, "Estimation of a multivariate density," Ann. Inst. Statist. Math., vol. 18, pp. 179-189, 1966.
K. Fukunaga et al, "Bayes Error Estimation Using Parzen and k-NN Procedures", IEEE Trans. on PAMI, vol. PAMI-9, No. 5, Sep. 1987, p. 634-643.
M. C. Jones et al, "Maximum likelihood kernel density estimation," Technical Report May 1, Department of Statistics, Open University, 2001.
J. Grim, et al, "Initialing Normal Mixtures of Densities," Proceedings of the 14th International Conf. On Pattern Recognition-vol. 1, pp. 886, 1998.
C. Lee and D. L. Landgrebe, "Feature Extraction Based on Decision Boundaries," IEEE Trans. On Pattern Analysis and Machine Intelligence, vol. 15, No. 4, Apr. 1993.
C. Lee and D. L. Landgrebe, "Decision Boundary Feature Extraction for Nonparametric Classification," IEEE Trans. On Systems, Man, and Cyber., vol. 23, No. 2, Mar./Apr. 1993.
NIST Report, "Summary of NIST Standards for Biometric Accuracy, Tamper Resistance, and Interoperability." ftp://sequoyah.nist.gov/pub/nist_internal_reports/NISTAPP_Nov02.pdf, 2002.
A. K. Jain, "Biometrics: A Grand Challenge", Proceeding of the 17th International Conference on Pattern Recognition, (ICPR'04), 2004.
B. Eckstein, "Evaluating the Benefits of assisted Target Recognition", Proceeding of the 30th Applied Imagery Pattern recognition Workshop (AIPR01), 2001.
S. Rizvi, "Fusion Techniques for Automatic Target Recognition", Proceedings of the 32nd Applied Imagery Pattern Recognition Workshop (AIPR'03), 2003.

* cited by examiner

| Number of Features | Exhaustive Search Feature Selection | Adaptive Polynomial Decision Boundary Feature Extraction | Adaptive Parzen Kernel Decision Boundary Feature Extraction |
|---|---|---|---|
| 1 | 81.4% | 94.4 % | 94.4 % |
| 2 | 94.4 % | 94.4 % | 94.4 % |

FIG.11C

GENERATING STATISTICS $$\mu_{Class-of-interest} = \begin{bmatrix} 0 \\ 2 \end{bmatrix}, \quad \Sigma_{Class\_of\_Interest} = \begin{bmatrix} 2 & 1 \\ 1 & 2 \end{bmatrix}$$

$$\mu_{Class-other} = \begin{bmatrix} 2 \\ 0 \end{bmatrix}, \quad \Sigma_{Class-other} = \begin{bmatrix} 2 & 1 \\ 1 & 2 \end{bmatrix}$$

FIG.11D

| Number of Features | Exhaustive Search Feature Selection | Adaptive Polynomial Decision Boundary Feature Extraction | Adaptive Parzen Kernel Decision Boundary Feature Extraction |
|---|---|---|---|
| 1 | 88 % | 89.4 % | 89.4 % |
| 2 | 91 % | 91 % | 91 % |

FIG.12C

GENERATING STATISTICS $$\mu_{Class\_of\_Interest} = \begin{bmatrix} 0 \\ 0 \end{bmatrix}, \quad \Sigma_{Class\_of\_Interest} = \begin{bmatrix} 4 & 0 \\ 0 & 4 \end{bmatrix}$$

$$\mu_{Class-other} = \begin{bmatrix} 4 \\ 2 \end{bmatrix}, \quad \Sigma_{class-other} = \begin{bmatrix} 3 & 1 \\ 1 & 3 \end{bmatrix}$$

FIG.12D

| Number of Features | Exhaustive Search Feature Selection | Adaptive Polynomial Decision Boundary Feature Extraction | Adaptive Parzen Kernel Decision Boundary Feature Extraction |
|---|---|---|---|
| 1 | 76.8 % | 91.4 % | 91.6 % |
| 2 | 91.6 % | 91.6 % | 91.6 % |

FIG.13C

GENERATING STATISTICS $$\mu_{Class\_of\_Interest} = \begin{bmatrix} 0 \\ 0 \end{bmatrix}, \quad \Sigma_{Class\_of\_Interest} = \begin{bmatrix} 3 & 0.5 \\ 0.5 & 3 \end{bmatrix}$$

$$\mu_{class-other_1} = \begin{bmatrix} -3 \\ 3 \end{bmatrix}, \quad \Sigma_{Class-other_1} = \begin{bmatrix} 2 & 0.5 \\ 0.5 & 2 \end{bmatrix}$$

$$\mu_{class-other_2} = \begin{bmatrix} 3 \\ -3 \end{bmatrix}, \quad \Sigma_{class-other_2} = \begin{bmatrix} 2 & 0.5 \\ 0.5 & 2 \end{bmatrix}$$

FIG.13D

| Number of Features | Exhaustive Search Feature Selection | Adaptive Polynomial Decision Boundary Feature Extraction | Adaptive Parzen Kernel Decision Boundary Feature Extraction |
|---|---|---|---|
| 1 | 64.8 % | 65.0 % | 64.6 % |
| 2 | 65.2 % | 65.2 % | 65.2 % |

FIG.14C

GENERATING STATISTICS $$\mu_{Class\_of\_Interest} = \begin{bmatrix} 0 \\ 0 \end{bmatrix}, \quad \Sigma_{Class\_of\_Interest} = \begin{bmatrix} 3 & 0 \\ 0 & 3 \end{bmatrix}$$

$$\mu_{Class-other} = \begin{bmatrix} 0 \\ 0 \end{bmatrix}, \quad \Sigma_{class-other} = \begin{bmatrix} 3 & 0 \\ 0 & 1 \end{bmatrix}$$

FIG.14D

ADAPTIVE BAYES FEATURE EXTRACTION

CROSS-REFERENCE TO RELATED APPLICATIONS

This application is related to application Ser. No. 12/004,329 filed on Dec. 20, 2007, entitled "Adaptive Bayes Pattern Recognition."

FEDERALLY SPONSORED RESEARCH

Not applicable

BACKGROUND OF INVENTION

1. Field of Invention

This invention relates generally to systems and methods for extracting optimal features for discriminating between two classes, a class-of-interest and a class-other, when training samples or otherwise, are provided a priori only for the class-of-interest thus eliminating the requirement for any a priori knowledge of the other classes in the input-data-set while exploiting the potentially robust and powerful feature extraction capability provided by fully supervised feature extraction approaches.

2. Prior Art

Pattern recognition requires that objects be described in terms of a set of measurable features. In pattern recognition, the patterns are generally represented as a vector of feature values (measurements). The selection of features can have considerable impact on classification performance.

Typically, the objective in pattern recognition is to minimize the classification error rate. The classification error rate is closely related to class separation, training sample size, dimensionally, and measurement noise. Hughes [G. F. Hughes, "On the Mean Accuracy of Statistical pattern Recognizers," IEEE Trans. Info. Theory, vol. IT-14, no. 1 (1968): pp. 55-63] showed that classification accuracy normally increases as the number of features increases until reaching an optimal number of features, at which point classification accuracy declines with the addition of new features. Adding features beyond an optimal number only adds noise to the parameters used in estimating the decision boundary, thus reducing classifier performance. The optimal number of features is a function of training sample size, measurement noise, and class separation.

Fukunaga [K. Fukunaga, "Effects of sample size in classifier design," IEEE Trans. Pattern Anal. Machine Intell., vol. 11, pp. 873-885, August 1989] showed that the number of training samples, required for a linear classifier to achieve a certain amount of error, is proportional to the number of dimensions. For quadratic classifiers, it is proportional to the square of the number of dimensions.

Feature selection seeks to reduce the original number of features used in classification while maintaining acceptable classification accuracy. Less discriminatory features are eliminated, leaving a subset of the original features which retain sufficient information to discriminate well among classes. Feature selection typically involves use of iterative search techniques which evaluate various combinations of features to select the best combination. If a large number of features are involved, feature selection tends to be computationally intensive [A. K. Jain, R. W. Duin, and J. Mao, "Statistical Pattern Recognition: A Review", IEEE transactions on Pattern Analysis and Machine Intelligence, vol. 22, no. 1, January 2000, pp.14-17].

Feature extraction is a more general method in which the original set of features is transformed using a linear combination of the original vectors [A. K. Jain, R. W. Duin, and J. Mao, "Statistical Pattern Recognition: A Review", IEEE transactions on Pattern Analysis and Machine Intelligence, vol. 22, no. 1, January 2000, pp. 12-14]. In particular, linear feature extraction techniques find a set of vectors that effectively represents the information content of an observation while reducing dimensionality. Many feature extraction methods derive the linear transformation in a single iteration, thus utilizing significantly less computer resources.

Interest in feature selection and extraction is being driven by: 1) the availability of new high-spectral resolution imaging sensors; 2) multi-sensor fusion (concatenating data from multiple sensors); 3) integration of data from multiple data models (sensor data is modeled using different approaches with the model parameters from multiple models being used as features); 4) the need for low dimensional (two or three dimensions) data representations to aid in visual exploration of data; and 5) data mining [A. K. Jain, R. W. Duin, and J. Mao, "Statistical Pattern Recognition: A Review", IEEE transactions on Pattern Analysis and Machine Intelligence, vol. 22, no. 1, pp. 14, January 2000].

In order to avoid the difficulties associated with too many features, preprocessing of the data using linear combinations of features to reduce dimensionality is highly desirable.

Most of the literature on feature extraction is restricted to pattern recognition applications where training samples are available which completely characterize all of the classes (objects) to be recognized in a data set. Using these training samples, optimal sets of features can be extracted which provide minimum error in classifying a data set.

However, in the real world, there are many applications where a priori knowledge, through training samples or otherwise, is only available for a single class, the classes-of-interest. The distribution of the other class may be 1) unknown, 2) may have changed, 3) may be inaccurate due to insufficient numbers of samples used to estimate the distribution of the other classes, or 4) the cost of obtaining labeling samples, for purposes of defining all the classes in a given dataset, by collecting ground truth or otherwise, may be very expensive or impossible to obtain. Often one is only interested in one class or a small number of classes.

This invention relates generally to systems and methods for extracting optimal features for discriminating between two classes, a class-of-interest and a class-other, when training samples or otherwise, are provided a priori only for the class-of-interest thus eliminating the requirement for any a priori knowledge of all of the other classes in a data set while exploiting the potentially robust and powerful discriminating capability provided by fully supervised feature extraction approaches. Adaptive Bayes Feature extraction is accomplished by exploiting the ability of the adaptive Bayes classifier to define optimal decision boundaries using only labeled samples from the class-of-interest and unlabeled samples from the data to be classified. Optimal features are derived from vectors which are normal to the decision boundary defined by the adaptive Bayes classifier.

The Adaptive Bayesian Approach to Pattern Recognition

Bayes decision theory is a fundamental approach to the problem of pattern recognition. The approach is based on the assumption that the decision problem can be poised in probabilistic terms where all of the relevant probability values are known. Specifically, the application of a standard Bayesian statistical supervised classifier usually requires estimating the posterior probabilities of each class [R. O. Duda and P. E. Hart, *Pattern classification and Scene Analysis*, New York:

John Wiley & Sons, 1973, pp. 10-31]. If information about probability distributions of classes is available, the posterior probability is calculated for every measurement and each measurement is attributed to the class with the maximum posterior probability.

The decision making process for using Bayes pattern recognition to classify data into two known classes can be summarized as follows: Given a set of measurement vectors, it desired is to associate the measurements with either the classes-of-interest or a class-other with minimum probability error. The set of measurements, X, can conveniently be represented as a vector in the measurement space. This vector will be called the measurement vector or simply a sample or a pattern and will be denoted as $X=(x_1, x_2, \ldots x_d)^T$ where d is the number of measurements or the dimensionality of the measurement space.

Let us defined the probability density functions of the two classes as follows—the class-of-interest is $P(X/C_{int})$ and the class-other is $P(X/C_{other})$. Each class has associated a priori probabilities of $P_{C_{int}}$ and $P_{C_{other}}$, respectively.

The standard maximum likelihood decision rule for this two class pattern recognition problem is:

$$\text{If: } P_{C_{int}}P(X/C_{int}) \geq P_{C_{other}}P(X/C_{other}), \quad (1)$$

Classify X as the class-of-interest
Otherwise, classify X as the class-other
where
$P(X/C_{int})$=Conditional probability density function of the class-of-interest
$P(X/C_{other})$=Conditional probability density function of class-other
$P_{C_{int}}$=a priori probability of the class-of-interest
$P_{C_{other}}$=a priori probability of class-other An equivalent decision rule, to eq. (1), can be obtained by dividing both sides of eq. (1) by the unconditional probability of X, which is P(X), or:

$$\text{If: } \frac{P_{C_{int}}P(X/C_{int})}{P(X)} \geq \frac{P_{C_{other}}P(X/C_{other})}{P(X)}; \quad (2)$$

Classify $X$ as the class-of-interest
Otherwise, classify $X$ as the class-other where $$P(X)=P_{C_{int}}P(X/C_{int})+P_{C_{other}}P(X/C_{other}) \quad (3)$$

Eq. (2) is the Bayes decision rule. It can be defined in terms of posterior probabilities as:

$$\text{If: } P(C_{int}/X) \geq P(C_{other}/X), \quad (4)$$

Classify X as the class of interest
Otherwise, classify X as the class-other
where $P(C_{int}/X)$ and $P(C_{other}/X)$ are the posterior probability distribution functions for the class-of-interest and the class-other. The posterior probability distribution functions are defined as:

$$P(C_{int}/X) = \frac{P_{C_{int}}P(X/C_{int})}{P(X)} \quad (5)$$

$$P(C_{other}/X) = \frac{P_{C_{other}}P(X/C_{other})}{P(X)} \quad (6)$$

Minter [T. C. Minter, "A Discriminant Procedure for Target Recognition in Imagery Data", Proceedings of the IEEE 1980 National Aerospace and Electronic Conference—NAECON 1980, May 20-22, 1980] proposed an alternative to the Bayes decision rule. It was noted that the posterior probability functions sum to 1, namely $$P(C_{int}/X)+P(C_{other}/X)=1 \quad (7)$$

Rearranging equation (7) we get $$P(C_{other}/X)=1-P(C_{int}/X) \quad (8)$$

Substituting eq. (8) into eq. (4) and simplifying we get an alternative Bayes decision function which only involves the posterior probability function for the class-of-interest, $P(C_{int}/X)$, namely $$\text{If: } P(C_{int}/X) \geq \tfrac{1}{2}, \quad (9)$$

Classify X as the class-of-interest
Otherwise, classify X as class-other
where again $$P(C_{int}/X) = \frac{P_{C_{int}}P(X/C_{int})}{P(X)} \quad (10)$$

Equation (9) is the referred to as the adaptive Bayes decision rule or the adaptive Bayes classifier. This formulation of the Bayes decision rule is particularly useful since it only requires a priori knowledge of the of the conditional density function for the class-of-interest, $P(X/C_{int})$, and the a priori probability for the class-of-interest, $P_{C_{int}}$. The unconditional probability function, P(X) can be estimated using any of a number of nonparametric density function techniques using only unlabeled samples from the data set of to be classified. However, an alternative least squares estimation technique is presented below for estimating of the posterior probability distribution function, $P(C_{int}/X)$, which uses only labeled sample from the class-of-interest and unlabeled samples from the data set to be classified.

The adaptive Bayesian decision rule, eq. (9), is adaptive in the sense that it adapts the decision boundary to provide optimal discrimination between the class-of-interest and any unknown class-other which may exist in the data set to be classified.

The adaptive Bayes decision rule, equation (9), can also be exploited for use in feature extraction. In particular, it will be shown that normal vectors to the decision boundary can be constructed to the decision boundary provided by adaptive Bayes decision rule. These normal vectors can then be used to extract discriminate features. This approach allows optimal features to be extracted using only labeled sample from the class-of-interest and unlabeled samples from the data set to be classified.

Procedures for Estimation of the Adaptive Bayes Decision Rule

First we will review two approaches for estimating the class-of-interest posterior distribution function, $P(C_{int}/X)$, used by the adaptive Bayes decision rule, eq. (9). The first approach uses nonparametric density function estimation techniques to approximate $P(C_{int}/X)$. The second approach approximates the posterior distribution function $P(C_{int}/X)$ in eq. (9) using a least squares estimation procedure.

Approximating the Class-of-Interest Posterior Distribution Function Using Nonparametric Density Estimation Techniques The density functions $P(X/C_{int})$ and, $P(X)$ in eq. (10), can be estimated using any of several non-parametric density techniques such as histogramming, Parzen kernel density estimation, and $K^{th}$ nearest neighbor estimation. Gorte [B. Gorte and N. Gorte-Kroupnova, "Non-parametric classification algorithm with an unknown class", *Proceedings of the International Symposium on Computer Vision*, 1995, pp. 443-448], Mantero [P. Mantero, "Partially supervised classification of remote sensing images using SVM-based probability density estimation", IEEE Transactions on Geoscience and Remote Sensing, vol. 43, no. 3, March 2005, pp. 559-570], and Guerrero-Curieses [A. Guerrero-Curieses, A Biasiotto, S. B. Serpico, and G. Moser, "Supervised Classification of Remote Sensing Images with Unknown Classes," Proceedings of IGARSS-2002 Conference, Toronto, Canada, June 2002] investigated the use of the $K^{th}$ nearest neighbor probability estimation [R. O. Duda and P. E. Hart, *Pattern Classification and Scene Analysis*, New York: John Wiley & Sons, 1973, pp. 95-98] to approximate the class-of-interest posterior distribution function, $P(C_{int}/X)$. They used a $K^{th}$ nearest neighbor approximation of $P(C_{int}/X)$ to classify remotely sensed data using the adaptive Bayes decision rule, eq. (9).

$K^{th}$ nearest neighbor has two disadvantages. The first disadvantage is that a $K^{th}$ nearest neighbor estimate of the class-of-interest posterior probability function $P(C_{int}/X)$ is very dependent on the value selected for K. Fukunaga [K. Fukunaga, D. M. Hummels, "Bayes Error Estimation Using Parzen and k-NN Procedures", IEEE Transactions on Pattern Analysis and Machine Intelligence, Vol. PAMI-9, Number 5, September 1987, p. 634-643] concluded there is no optimal method for selecting a value for K. The approach often used is to evaluate the classification accuracy obtained using various values of K and select the value of K that maximizes classification accuracy. However, this approach requires that labeled samples be available from all the classes for use in evaluating classification accuracy. The second disadvantage is that $K^{th}$ nearest neighbor is computationally slow as a result of the need to repeatedly compute the distance, from the measurement vector to be classified, to the other measurements vectors in the data set.

Least Squares Estimation of the Adaptive Bayes Decision Function

Minter [T. C. Minter, "A Discriminant Procedure for Target Recognition in Imagery Data", Proceedings of the IEEE 1980 National Aerospace and Electronic Conference—NAECON 1980, May 20-22, 1980], proposed a least squares criterion for estimating the class-of-interest posterior distribution in eq. (9). The posterior distribution for the class-of-interest can be approximated by minimizing the mean square difference between the estimated posterior distribution function and the true posterior distribution function for the class-of-interest. This is accomplished using the following least squares criterion:

$$J = \int (\hat{P}(C_{int}/X) - P(C_{int}/X))^2 P(X)dX + K \quad (11)$$

where $$P(C_{int}/X) = \frac{P_{C_{int}} P(X/C_{int})}{P(X)} \quad (12)$$

In eq. (11), $\hat{P}(C_{int}/X)$ is the estimated posterior distribution for the class-of-interest, and $P(C_{int}/X)$ is the true (but unknown) posterior distribution of the class-of-interest. K is an arbitrary constant.

However, the least squares criteria, eq. (11), cannot be minimized directly since the true posterior distribution function, $P(C_{int}/X)$, is unknown.

However, the least square criterion, eq. (11), can be reformulated to provide an equivalent criterion that can be minimized to estimate the class-of-interest posterior distribution function $\hat{P}(C_{int}/X)$ in eq. (9) as is shown below.

First, expanding the least squares criteria, eq. (11), we get $$J = \int (\hat{P}(C_{int}/X)^2 - 2\hat{P}(C_{int}/X)P(C_{int}/X) + P(C_{int}/X)^2)P(X) \\ dX + K \quad (13)$$

$$J = \int (\hat{P}(C_{int}/X)^2 - 2\hat{P}(C_{int}/X)P(C_{int}/X) + P(C_{int}/X)^2)P(X) \\ dX + K \quad (14)$$

$$J = \int (\hat{P}(C_{int}/X)^2 P(X)dX - \int 2\hat{P}(C_{int}/X)P(C_{int}/X)P(X)dX + \int P \\ (C_{int}/X)^2 P(X)dX + K \quad (15)$$

$$J = \\ \int \left(\hat{P}(C_{int}/X)^2 P(X)dX - \int 2\hat{P}(C_{int}/X)\frac{P_{C_{int}}P(X/C_{int})}{P(X)}P(X)dX + \\ \int P(C_{int}/X)^2 P(X)dX + K \quad (16)$$

$$J = \int (\hat{P}(C_{int}/X)^2 P(X)dX - \int 2\hat{P}(C_{int}/X)P_{C_{int}}P(X/C_{int})P(X) \\ dX + \int P(C_{int}/X)^2 P(X)dX + K$$

Now let $$K' = 2P_{C_{int}} = 2P_{C_{int}}\int P(X/C_{int})dX \quad (17)$$

and we get:

$$J = \int (\hat{P}(C_{int}/X)^2 P(X)dX - 2P_{C_{int}}\int [\hat{P}(C_{int}/X) - 1]P(X/C_{int}) \\ dX + K' \quad (18)$$

where K' is another constant, as defined in eq. (17).

Next we define the expected value with respect to the labeled samples from the class-of-interest as:

$$E_{C_{int}}(\circ) = \int (\circ)P(X/C_{int})dX \quad (19)$$

The expected value with respect to the unlabeled samples from $P(X)$ (the data to be classified) is defined as:

$$E(\circ) = \int (\circ)P(X)dX \quad (20)$$

Using these definitions, the least square criteria, eq. (18), can be rewritten as:

$$J = E[\hat{P}(C_{int}/X)^2] + 2P_{C_{int}}E_{C_{int}}[\hat{P}(C_{int}/X) - 1] + K' \quad (21)$$

The posterior distribution of the class-of-interest $\hat{P}(C_{int}/X)$ is approximated using the following linear combination of "functions of the measurements".

$$\hat{P}(C_{int}/X) \cong A^T F(X) \quad (22)$$

where F(X) is as vector containing functions of the measurements or $$F(X) = (f(X)_1, f(X)_2, \ldots f(X)_n)^T \quad (23)$$

and A is a vector of weights for the f(X)'s $$A = (a_1, a_2, \ldots a_n)^T \quad (24)$$

Substituting eq. (25) for $\hat{P}(C_{int}/X)$ in eq. (24) we get:

$$J = E[(A^T F(X))^2] + 2P_{C_{int}}E_{C_{int}}[A^T F(X) - 1] + K' \quad (25)$$

This formulation of the least square error criteria, eq. (25), is equivalent to the original least squares criterion, eq. (11), however, eq. (25) can be evaluated since there are no unknowns. In addition, eq. (25) can be evaluated using only labeled samples from the class-of-interest and unlabeled samples from the data set to be classified, P(X).

An estimate of the parameters of the weighting vector A, in eq. (24), is obtained by minimization of the least-square criterion, defined in eq. (25).

Differentiating the J in eq. (25) with-respect-to A and setting to zero we get:

$$\frac{\delta J}{\delta A} = 2E[(F(X)F(X)^T A)] + 2P_{C_{int}} E_{C_{int}}[F(X)] = 0 \quad (26)$$

Rearranging yields $$E[(F(X)F(X)^T)]A = P_{C_{int}} E_{C_{int}}[F(X)] \quad (27)$$

and finally we get $$A = P_{C_{int}} E[(F(X)F(X)^T)]^{-1} \cdot E_{C_{int}}[F(X)] \quad (28)$$

Given a set of N unlabeled samples $(X_1, X_2, \ldots X_N)$ from the data set to be classified and M labeled samples from the class-of-interest, $(X_1(C_{int}), X_2(C_{int}), \ldots X_M(C_{int}))$ the parameter vector A may be estimated as follows:

$$A = P_{C_{int}} \left[ \frac{1}{N} \sum_{i=1}^{N} (F(X_i)F(X_i)^T) \right]^{-1} \cdot \frac{1}{M} \sum_{j=1}^{m} [f(X_j(C_{int}))] \quad (29)$$

Using the parameter vector A, estimated in eq. (29), the adaptive Bayes decision rule, eq. (9) can be rewritten as If: $A^T F(X) \geq \frac{1}{2}$, (30)

Classify X as class-of-interest
Otherwise classify X as class-other
where eq. (22) has been substituted for $\hat{P}(C_{int}/X)$, in the adaptive Bayes decision rule, eq. (9).

Functions for Least Squares Approximation of the Posterior Distribution of the Class-Of-Interest Below, two approaches are presented for approximating the class-of-interest posterior distribution, $P(C_{int}/X)$ in eq. (9), using the least square criteria. The first method approximates the class-of-interest posterior distribution function using a polynomial. The second method approximates the class-of-interest posterior distribution function using Parzen kernels.

Polynomial Approximation of the Posterior Distribution Function

Minter [T. C. Minter, "A Discriminant Procedure for Target Recognition in Imagery Data", Proceedings of the IEEE 1980 National Aerospace and Electronic Conference—NAECON 1980, May 20-22, 1980] proposed using a polynomial to approximate the class-of-interest posterior probability $\hat{P}(C_{int}/X)$.

The class-of-interest posterior distribution function, $\hat{P}(C_{int}/X)$, can be approximated with a polynomial of any order—first, second, third, etc. However, the order of the polynomial used to fit the class-of-interest posterior distribution also determines the order of the decision boundary used to separate the class-of-interest and the class-other.

For example, if we have a two dimension measurement vector, we can approximate the class-of-interest posterior probability distribution function using a second order polynomial function, of the form:

$$\hat{P}(C_{int}/X) \cong a_0 + a_1 x_1 + a_2 x_2 + a_3 x_1 x_2 + a_4 x_1^2 + a_5 x_2^2 \quad (31)$$

or using vector notation $$\hat{P}(C_{int}/X) \cong A^T F(X) \quad (32)$$

where $$A = (a_0, a_1, a_2, a_3, a_4, a_5)^T \quad (33)$$

and $$F(X) = (1, x_1, x_2, x_1 x_2, x_1^2, x_2^2) \quad (34)$$

Use of the second order function in eq. (31) implies the decision boundary will be quadratic. If the distributions of the two class density functions are Gaussian with unequal covariance matrices, a quadratic decision boundary is optimal [R. O. Duda and P. E. Hart, *Pattern Classification and Scene Analysis*, New York: John Wiley & Sons, 1973, pp. 30].

If the expected decision boundary is highly complex, an even higher order polynomial may be required.

The use of polynomials in approximating the class-of-interest posterior probability distribution function, $\hat{P}(C_{int}/X)$, has two disadvantages. First, a priori knowledge of the complexity of the decision boundary is required to select the appropriate order polynomial.

Second, the size of the F(X) vector, eq. (34), is a function of the number of measurements and the order of the polynomial used. For a second order polynomial, the number of elements in F(X), eq. (34), is $(1+2d+d(d-1)/2)$ where d is the number of dimensions or number of measurements. When the size of F(X) becomes too large, the inversion of the $F(X)F(X)^T$ matrix, eq. (29), becomes problematic and limits the usefulness of polynomial approximations of $\hat{P}(C_{int}/X)$. For example, for a 25 dimension measurement vector (d=25) and a second order polynomial, the vector, F(X) eq. (34), has 351 elements and the $F(X)F(X)^T$ matrix, eq. (29), is a 351×351 matrix. Cross-product terms account for most of the 351 elements in vector F(X). Inverting such a large matrix is computationally expensive and prone to numerical errors. In addition, classification of one of these twenty-five dimension measurement vectors would require the multiplication of a 351×351 matrix and a 351×1 vector, which is also computationally expensive.

However, if the dimensionality of the data is low (for example, if d=8 and a second order polynomial is used) then the size of the $F(X)F(X)^T$ matrix is only a 45×45 matrix. Most computers can easily invert a matrix of this size. Therefore polynomials are useful in approximating of $\hat{P}(C_{int}/X)$ for low dimension data.

Approximating the Class-of-Interest Posterior Distribution Function with Parzen Kernels Densities The kernel method of estimating density functions is a well-known and much studied technique for nonparametric density estimation [R. O. Duda and P. E. Hart, *Pattern Cassification and Scene Analysis*, New York: John Wiley & Sons, 1973, pp. 88-95]. The need for nonparametric techniques stems from a wide range of applications in which the experimenter is unwilling to assume a parametric family for the true underlying probability density function. The basic foundation for nonparametric density estimation was Fix and Hodges' [E. Fix and J. L. Hodges, "Discriminatory analysis, nonparametric discrimination," U. S. Air Force School of Aviation Medicine, Randolph Field, Tex Project 21-49-004, Rep. 4, Contract AF-41-(128)-31, February 1951] original work. They based their results on the concept that the value of a density function at a point can be estimated using the number of sample observations that fall within a small region around that point.

Rosenblatt [M. Rosenblatt, "Remarks on some nonparametric estimates of a density function," *Ann. Math. Statist.*, vol 27, pp.832-837, 1956], Whittle [P. Whittle, "On the smoothing of probability density functions," *J. Roy. Statist.*, Ser B, vol. 20, pp. 334-343, 1958], Parzen [17], and Cacoullos [T. Cacoullos, "Estimation of a multivariate density," *Ann. Inst. Statist. Math.*, vol. 18, pp. 179-189, 1966] generalized these results and developed the Parzen kernel class of estimators. Conditions on the kernel function were derived to ensure asymptotically unbiased, and uniformly consistent estimators.

Given R samples, $S=\{X_1, \ldots X_R\}$ drawn from a population with probability density function P(X), the Parzen density estimate $\hat{P}(X)$ of the unknown probability function a sample X is defined as $$P(X) = \frac{1}{R}\sum_{i=1}^{M} \frac{1}{h} K\left(\frac{X-X_i}{h}\right) \quad (35)$$

where $K(\cdot)$ is a window or kernel function and h is the window width, smoothing parameter, or simply the kernel size. The samples in the set $S=\{X_1, \ldots X_R\}$ are used as the function kernels for $K_i$.

Often it is convenient to assume a d-dimension Gaussian form for kernels, or $$\hat{P}(X/k_i) = \frac{1}{2\pi^{d/2}|H|^{1/2}} e^{-1/2(X-X_i)^T H^{-1}(X-X_i)} \quad (36)$$

where H is the kernel smoothing parameter and the data points $X_i$, from $S=\{X_1, \ldots X_R\}$ replaces the mean of $\hat{P}(X/k_i)$. H is defined as $$H = \begin{bmatrix} h_{11}^2 & \ldots & h_{1d}^2 \\ \vdots & \ddots & \vdots \\ h_{d1}^2 & \ldots & h_{dd}^2 \end{bmatrix} \quad (37)$$

This expanded form of h accounts for both measurement scaling and correlation between the measurements. A procedure for estimating H will be defined later.

Using eq. (36), the multi-dimensional Parzen density estimate at X is defined as $$\hat{P}(X) = \frac{1}{R}\sum_{i=1}^{M} \hat{P}(X/k_i) \quad (38)$$

A modified Parzen kernel estimator can be used to approximate the class-of-interest posterior distribution, $P(C_{int}/X)$.

The approximation for the class-of-interest posterior distribution function $P(C_{int}/X)$ using $A^T F(X)$, is defined as follows:

The function-of-features, f(X)'s, (in the vector F(X), eq. (23)) are defined as $$f(X)_i = \frac{P(X/k_i)}{P(X)} \quad (39)$$

The vector, F(X) is then defined as $$F(X) = \left[\frac{P(X/k_1)}{P(X)}, \frac{P(X/k_2)}{P(X)}, \ldots \frac{P(X/k_R)}{P(X)}\right]^T \quad (40)$$

where $P(X/k_i)$ is defined in eq. (36) and P(X) is defined in eq. (38).

The parameters of the weighting vector, A, are defined as $$A=(a_1, a_2, \ldots a_R)^T \quad (41)$$

Taking the product of $A^T F(X)$, we get $$A^T F(X) = a_1 \frac{P(X/k_1)}{P(X)} + a_2 \frac{P(X/k_2)}{P(X)} \ldots + a_R \frac{P(X/k_R)}{P(X)} \quad (42)$$

or $$A^T F(X) = \sum_{i=1}^{R} a_i \frac{P(X/k_i)}{P(X)} \quad (43)$$

Thus, $A^T F(X)$ is seen to be weighted linear combination of posterior distributions estimated using Parzen kernels. The weighting vector A is estimated using the least squares estimator, eq. (29).

The number of computations required to compute the Parzen kernel estimate of the class-of-interest posterior distribution function $A^T F(X)$, eq. (43), increases linearly as the number of features increases. This linear relationship between the number of features and the number of computations means that the Parzen kernel estimator can be used to extract useful features from high dimensional data.

Estimating the Smoothing Parameter, H, for the Parzen Kernels

A number of authors have studied the problem of determining a value for the Parzen smoothing parameter h. Fukunaga [K. Fukunaga, D. M. Hummels, "Bayes Error Estimation Using Parzen and k-NN Procedures", IEEE Transactions on Pattern Analysis and Machine Intelligence, Vol. PAMI-9, Number 5, September 1987, p. 634-643] evaluated a least squares approach for estimating h. However, Fukunaga's least square estimator of h is not directly related to the set of kernels selected and was shown to provide inconsistent results.

U.S. Pat. No. 6,317,517, issued to Liang, et al., disclosed a method for using classification accuracy as a means for selecting an optimal value for smoothing parameter h. However this approach requires that training samples be available for all the classes.

Jones [M. C. Jones and D. A. Henderson, "Maximum likelihood kernel density estimation," Technical Report 05/01, Department of Statistics, Open University] and Grim [J. Grim, J. Novovicova, P. Pudil, and P. Somol, "Initialing Normal Mixtures of Densities," Proceedings of the 14th International Conference on Pattern Recognition-Volume 1, p. 886, 1998] suggested an approach for estimating the kernel smoothing parameter, H, using maximum likelihood estimation. They used the well known log-likelihood criterion for finite mixtures [R. O. Duda and P. E. Hart, *Pattern Classification and Scene Analysis*, New York: John Wiley & Sons, 1973, pp. 189-201, pp. 189-201] to estimate an optimal smoothing matrix for the unknown density. In particular, a smoothing parameter, $H_i$, is estimated for each kernel density, $k_i$ i=1 ... R, using an iterative equation. An optimal smoothing parameter, H, was obtained for the unknown density function by computing a weighted average of the individual kernels $H_i$'s. This procedure provides useful results but is computationally intensive.

An alternative maximum likelihood kernel density estimation technique is presented below which provides a maximum likelihood estimate of the smoothing matrix for the unknown density function. An iterative technique is derived which estimates a value for H which is common all kernels.

One interpretation of the kernel density estimator is that it is a special case of the mixture density model of the form $$P(X) = \sum_{i=1}^{M} P_{k_i} \frac{1}{2\pi^{d/2}|H|^{1/2}} e^{-1/2(X-X_i)^T H^{-1}(X-X_i)} \quad (44)$$

where the data points $X_i$, i=1 ... R replace the Gaussian means, $P_{ki}$ is the a priori probability of the kernel, and all the kernels share a common smoothing parameter H.

First we will let the a priori probability of the kernels be $$P_{k_i} = \frac{1}{R} \quad (45)$$

Now, suppose we are given a set $\Psi=\{X_1, X_2, \ldots X_N\}$ of N unlabeled samples drawn independently from the mixture density, $$P(X \mid H) = \sum_{i=1}^{R} P_{k_i} P(X / k_i, H) \quad (46)$$

where the smoothing parameter H is fixed but unknown.

The likelihood of the observed samples is by definition the joint probability $$P(\Psi \mid H) = \prod_{j=1}^{N} P(X_j / H) \quad (47)$$

The maximum likelihood estimate of H is that value of $\hat{H}$ that maximizes $P(\Psi|H)$. Let L be the logarithm of the likelihood, then $$L = \sum_{j=1}^{N} \log P(X_j / H) \quad (48)$$

Differentiating L, eq. (48), with respect to H and setting the resulting expression to zero, we get $$\frac{\delta L}{\delta H} = \sum_{j=1}^{N} \sum_{i=1}^{R} \frac{P_{k_i} \cdot P(X_j/k_i, H)}{P(X_j/H)} \left[ -\frac{1}{2} \cdot H^{-1} + \frac{1}{2} H^{-1}(X_j - X_i)(X_j - X_i)^T H^{-1} \right] = 0 \quad (49)$$

Solving eq. (49) for H, we obtain the following maximum likelihood estimator for H $$\hat{H} = \sum_{j=1}^{N} \sum_{i=1}^{R} \frac{P_{k_i} \cdot P(X_j/k_i)}{P(X_j)} \cdot \left[ \frac{1}{2}(X_j - X_i)(X_j - X_i)^T \right] \quad (50)$$

Eq. (50) is an iterative maximum likelihood estimator for the smoothing parameter, H. Given an initial value for $H_0$, an updated value is obtained for H. After each update of H, the logarithm of the likelihood, eq. (48) is evaluated. This process is repeated until there is no further change in the logarithm of the likelihood, eq. (48).

Adaptive Feature Selection Using Decision Boundaries Provided by the Adaptive Bayes Pattern Recognition Algorithm Lee and Landgrebe [C. Lee and D. L. Landgrebe, "Feature Extraction Based on Decision Boundaries," *IEEE Trans. On Pattern Analysis and Machine Intelligence*, vol. 15, no. 4, April 1993] and [C. Lee and D. L. Landgrebe, "Decision Boundary Feature Extraction for Nonparametric Classification," *IEEE Trans. On Systems, Man, and Cybernetics*, vol. 23, no. 2, March/April 1993] showed that optimal features can be extracted for use in classification based directly on decision boundaries. They showed that discriminant features are directly related to decision boundaries and these features can be derived from decision boundaries. Their algorithm requires that labeled training samples (or alternatively, class density functions) be available for all classes. It will be shown below that this concept, coupled with the previously presented adaptive Bayes classifier, eq. (9), can be applied to perform Adaptive Bayes Feature Extraction.

Two non-parametric adaptive feature selection techniques are presented below that extracts linear combination of discriminant features using only labeled samples from the class-of-interest and unlabeled samples from the data set to be classified and the decision boundary provide by adaptive Bayes classifier.

The Adaptive Bayes Decision Boundary

The adaptive Bayres decision boundary is the locus of all the points where the posterior probability function in eq. (9) is equal to ½, or:

$$P(C_{int}/X) - \frac{1}{2} = 0 \quad (51)$$

or, using the least-squares approximation of $\hat{P}(C_{int}/X)$ the decision boundary, eq.(30), is the locus of all the points where;

$$A^T F(x) - \frac{1}{2} = 0 \quad (52)$$

FIG. 1 shows an example of the decision boundary for two classes, 10 and 12, where the covariance matrices are equal.

The decision boundary, 14, in this example, is linear.

In this example, the mean vectors and covariance matrices of the two bi-variant Gaussian classes are as follows:

$$\mu_{Class\_of\_Interest} = \begin{bmatrix} 1 \\ 2 \end{bmatrix}, \Sigma_{Class\_of\_Interest} = \begin{bmatrix} 1 & 0.5 \\ 0.5 & 1 \end{bmatrix} \quad (53)$$

$$\mu_{Class\text{-}other} = \begin{bmatrix} 2 \\ 1 \end{bmatrix}, \Sigma_{Class\text{-}other} = \begin{bmatrix} 1 & 0.5 \\ 0.5 & 1 \end{bmatrix} \quad (54)$$

These distributions are shown in FIG. 1 as two sigma "ellipses of concentration", 10 and 12.

Also shown in FIG. 1 is a unit normal vector to the decision boundary 16. This normal vector is the primary discriminant feature vector for this example. A linear combination of features based on this vector will provide maximum discrimination between these two classes. The intrinsic dimensionality of this problem is 1 since a second feature vector, orthogonal to the first normal, would provide no additional information for discriminating between the two classes.

The unit normal vector 16 in FIG. 1 is defined as $$N = \frac{1}{\sqrt{2}}(-1, 1) \quad (55)$$

Decision Boundary Feature Matrix

The effectiveness of the unit normal vector as a discriminant feature is roughly proportional to the area of the decision boundary that has the same normal vector.

Let N(X) be the unit normal vector to the decision boundary at a point X on the decision boundary for a given pattern classification problem. Lee and Landgrebe [C. Lee and D. L. Landgrebe, "Feature Extraction Based on Decision Boundaries," *IEEE Trans. On Pattern Analysis and Machine Intelligence*, vol. 15, no. 4, April 1993] define a decision boundary feature matrix, $M_{DBFM}$ as $$M_{DBFM} = \frac{1}{K} \int_S N(X) N^t(X) p(X) dX \quad (56)$$

where p(X) is the probability density function and K is $$K = \int_S p(X) dX \quad (57)$$

and S is the decision boundary, and the integral is performed over the decision boundary.

In the FIG. 1, it is obvious that the vector normal to the decision boundary is the same for any point on the decision boundary. The decision boundary feature matrix for the decision boundary in FIG. 1 is given by $$M_{DBFM} = \frac{1}{K} \int_S N(X) N^T(X) p(X) dX \quad (58)$$

$$M_{DBFM} = \frac{1}{K} NN^T \int_S p(X) dX = NN^T \quad (59)$$

and the decision boundary feature matrix, $M_{DBFM}$, for the normal vector in FIG. 1 is $$M_{DBFM} = \frac{1}{\sqrt{2}}(-1, 1)^t \cdot \frac{1}{\sqrt{2}}(-1, 1) = \frac{1}{2}\begin{bmatrix} 1 & -1 \\ -1 & 1 \end{bmatrix} \quad (60)$$

and the rank of $M_{DBFM}$, is $$\text{Rank}(M_{DBFM}) = 1 \quad (61)$$

In this example, since the rank of the decision boundary feature matrix, $M_{DBFM}$, is one, the intrinsic discriminant dimensionality of $M_{DBFM}$ is one.

Solving for the eigenvalues and eigenvectors of the decision boundary feature matrix, defined in eq. (60), we get:

$$eigenvalues\{M_{DBFM}\} = \begin{bmatrix} 1 \\ 0 \end{bmatrix} \quad (62)$$

and the two eigenvectors are $$eigenvector\{M_{DBFM}\}_1 = \begin{bmatrix} 0.707 \\ -0.707 \end{bmatrix} \quad (63)$$

$$eigenvector\{M_{DBFM}\}_2 = \begin{bmatrix} 0.707 \\ 0.707 \end{bmatrix} \quad (64)$$

We see that the eigenvalue for the first eigenvector is one and the eigenvalue of the second eigenvector is zero. This indicates that the first eigenvector, eq. (63), provides all of the discrimination between the classes.

FIG. 2 is an example of two bivariate Gaussian classes, 18 and 20, with the following mean vectors and covariance matrices:

$$\mu_{Class\_of\_Interest} = \begin{bmatrix} 1 \\ 2 \end{bmatrix}, \Sigma_{Class\_of\_Interest} = \begin{bmatrix} 1 & 0.5 \\ 0.5 & 1 \end{bmatrix} \quad (65)$$

$$\mu_{Class\text{-}other} = \begin{bmatrix} 1 \\ 2 \end{bmatrix}, \Sigma_{Class\text{-}other} = \begin{bmatrix} 1 & -0.5 \\ -0.5 & 1 \end{bmatrix} \quad (66)$$

Again, these distributions are shown in FIG. 2 as "ellipses of concentration".

Since the covariance matrices are unequal in this example, the decision boundary 22 is a quadratic curve. It can be seen that the directions of the unit normals 24 to this decision boundary vary along the decision boundary. This implies that two features are needed to achieve the same classification accuracy as in the original feature space.

Decision Boundaries and Effective Decision Boundaries

It was seen in FIGS. 1 and 2, that the decision boundary of a two-class problem is the locus of points for which the class-of-interest posteriori probability is equal to one-half. Although a decision boundary can be extended to infinity, only a portion of the decision boundary affects the classification results. We define the effective decision boundary as the intersection of the decision boundary with the region where most of the data is located. FIGS. 3 and 4 show examples of decision boundaries, 30 and 38, and effective decision boundaries, 32 and 40.

In a similar way, we define an effective boundary feature matrix (EDBFM) in the same as the decision boundary feature matrix, except that only the effective decision boundary is considered instead of the entire decision boundary. $M_{EDBFM}$ is defined as:

$$M_{DBFM} = \frac{1}{K'} \int_{S'} N(X)N(X)^T p(X) dX \qquad (67)$$

where p(X) is the probability density function and $$K' = \int_{S'} p(X) dX \qquad (68)$$

and S' is the effective decision boundary, and the integral is performed over the effective decision boundary.

Procedure for Finding the Decision Boundary Feature Matrix

As was shown in FIGS. 3 and 4, the effective decision boundaries, 32 and 40, displayed as bold lines, plays a significant role in discriminating between the classes, whereas the parts of the decision boundary displayed as dashed lines, 30 and 38, are rarely used in discriminating between the classes. Feature extraction based on the effective decision boundary instead of the complete decision boundary will result in fewer features while achieving nearly the same classification accuracy.

The basic concept for calculating the effective decision boundary feature matrix is illustrated in FIG. 5. First the unlabeled samples from the data set under consideration are classified as either class-of-interest or class-other using the adaptive Bayes decision rule, eq. (9). As shown in FIG. 5, a subset the classified samples lying near the decision boundary 46 is extracted. Samples lying near the decision boundary are readily identified, since the value of their posterior probability, $\hat{P}(C_{int}/X)$, is close to ½.

For each sample classified as "class-of-interest", the nearest sample classified as "class-other", on the other side of the decision boundary, is located. Vectors 50 are constructed between pairs of samples as shown in FIG. 5. A search is made along this vector for the point where the vector crosses the decision boundary. At the point where the vector crosses the decision boundary, the posterior probably, $\hat{P}(C_{int}/X)$, is equal to ½. Unit normal vectors to the decision boundary 48 are computed at these points. This procedure is repeated for all samples classified as "class-other". These unit normals are then used to derive a set of orthogonal feature extraction vectors.

FIG. 6 shows the results of an example of the application of this boundary finding procedure to find points 58 on the decision boundary 56 using the data shown in FIG. 3. These points 58 are used to calculate normals to the decision boundary.

SUMMARY

A system and method for extracting "discriminately informative features" from input patterns which provide optimal discrimination between a class-of-interest and a class-other while reducing the number of features, when training samples or otherwise, are provided a priori only for the class-of-interest thus eliminating the requirement for any a priori knowledge of the other classes in the input-data-set while exploiting the potentially robust and powerful feature extraction capability provided by fully supervised feature extraction approaches.

The system and method may be used in feature extraction applications where only limited information, in form of class definitions, training samples or otherwise, is only provided a priori for the class-of-interest. The distribution of the other classes may be 1) unknown, 2) may have changed 3) may be inaccurate due to insufficient numbers of samples used to estimate the distribution of the other class, or 4) the cost of obtaining labeling samples, for purposes of defining all the classes in a given data set, by collecting ground truth or otherwise, may be very expensive or impossible to obtain. Often one is only interested in one class or a small number of classes.

Discriminately informative features are related to decision boundaries. An Adaptive Bayes Feature Extraction algorithm constructs normal vectors to adaptive Bayes classifier decision boundaries. Discriminately informative features are extracted from these normals to the decision boundary. In addition, the Adaptive Bayes Feature Extraction algorithm extracts useful features for separating the class-of-interest from other unknown classes in a data set, using only information on the class-of-interest and unlabeled data from the data set to be classified.

The operation of the system can be divided into an off-line (feature definition) procedure and an on-line (feature extraction) procedure.

In a first embodiment of the system and method, the off-line procedure utilizes a system module to process labeled information from a set of labeled patterns, descriptive of the class-of-interest, and unlabeled patterns from the data set to be classified, to define optimal features based on normals to an adaptive Bayes decision boundary estimated using a polynomial.

In a second embodiment of the system and method, the off-line procedure utilizes a system module to process labeled information from a set of labeled patterns, descriptive of the class-of-interest, and unlabeled patterns from the data set to be classified, to define optimal features based on normals to an adaptive Bayes decision boundary estimated using Parzen kernels.

The Adaptive Bayes Feature Extraction algorithm is adaptive in the sense that it extracts a set of features that are optimal for discriminating between a class-of-interest and any unknown class-other which may exist in the data set to be classified. If a new set of data is considered for classification, a new set of features can be extracted which are optimal for the new data set.

The Adaptive Bayes Feature Extraction algorithm is nonparametric since it extracts optimal features based on normals to decision boundaries defined using nonparametric classifiers.

DRAWINGS—FIGURES

Figure 13A:
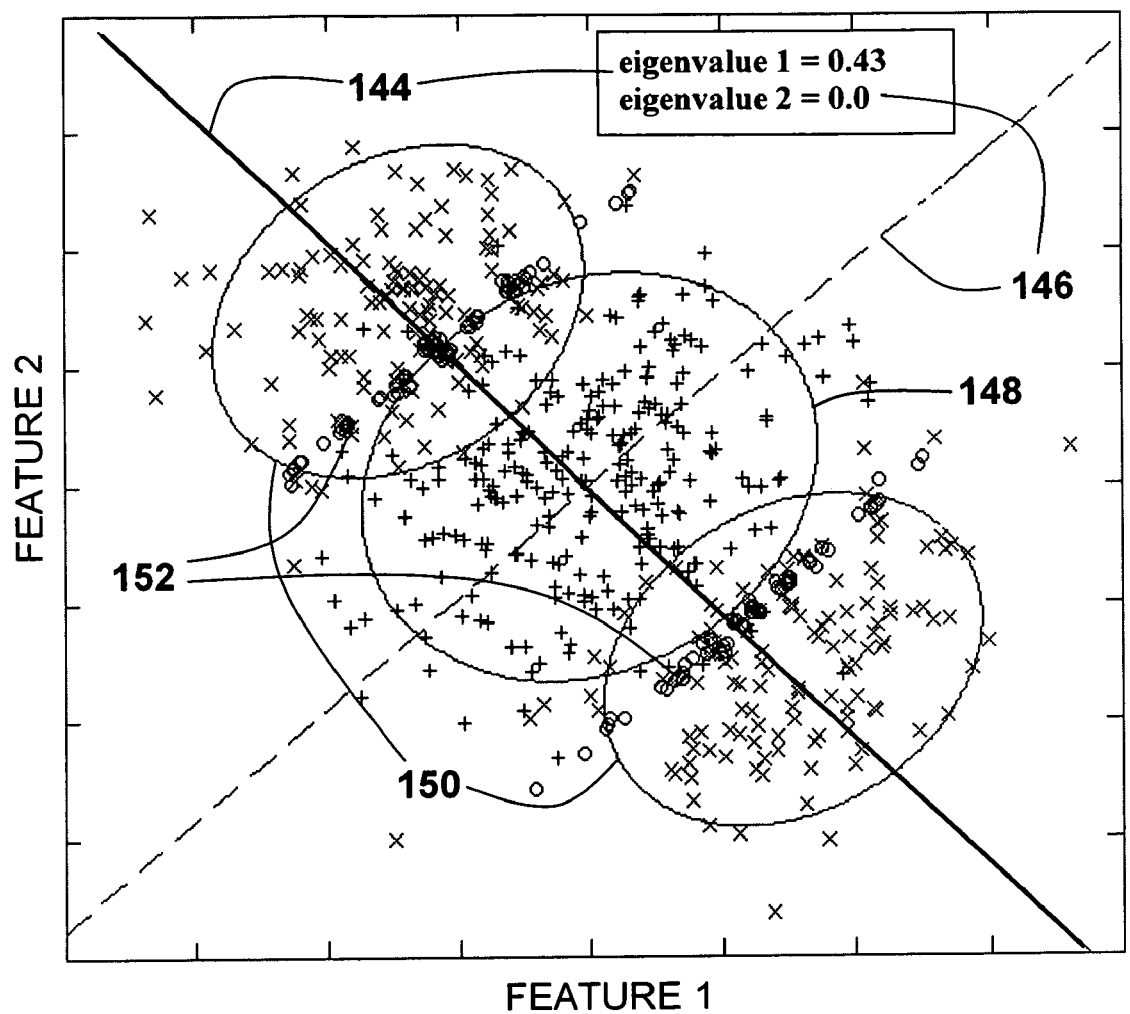
Figure 13B:
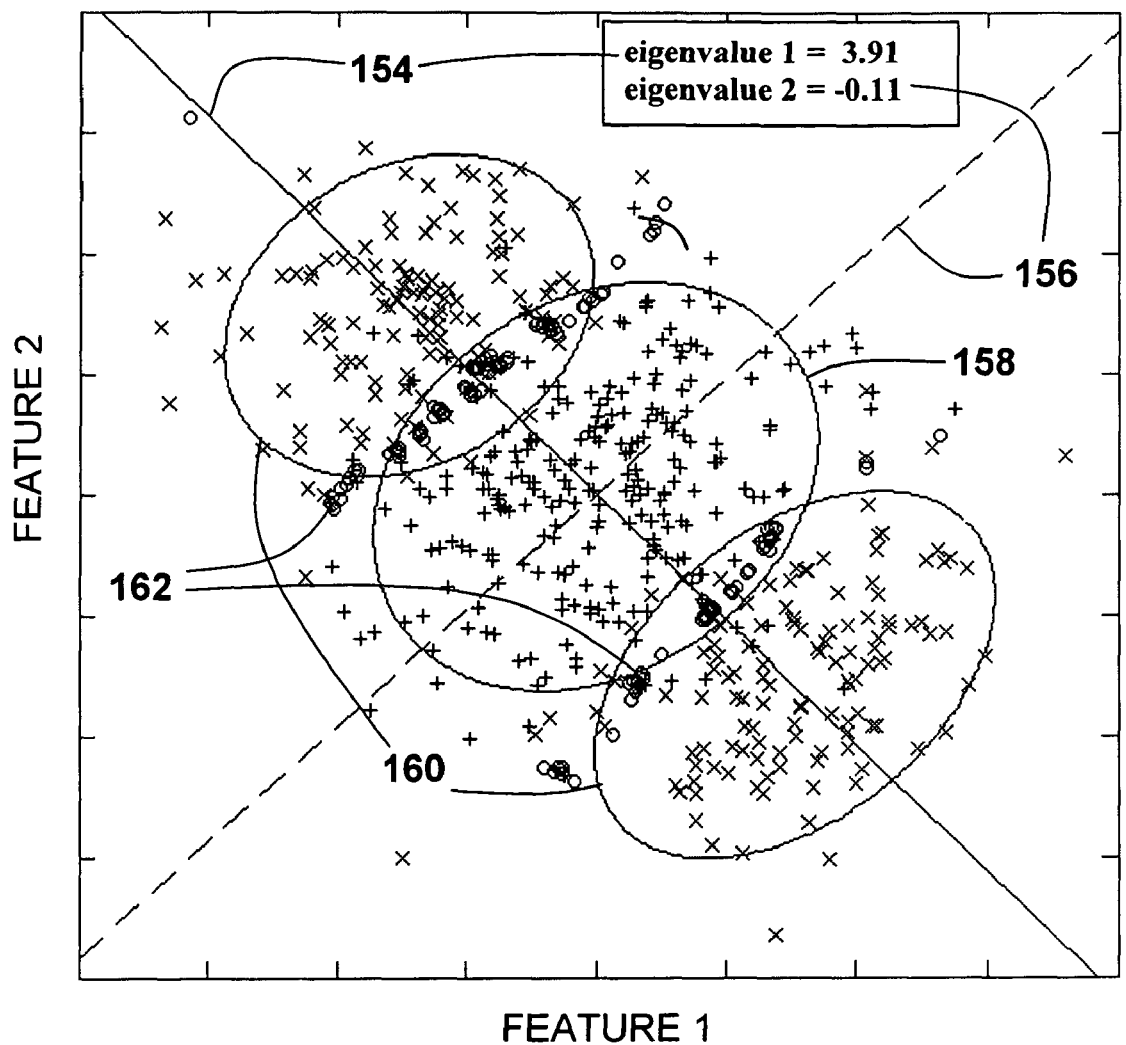
Figure 14A:
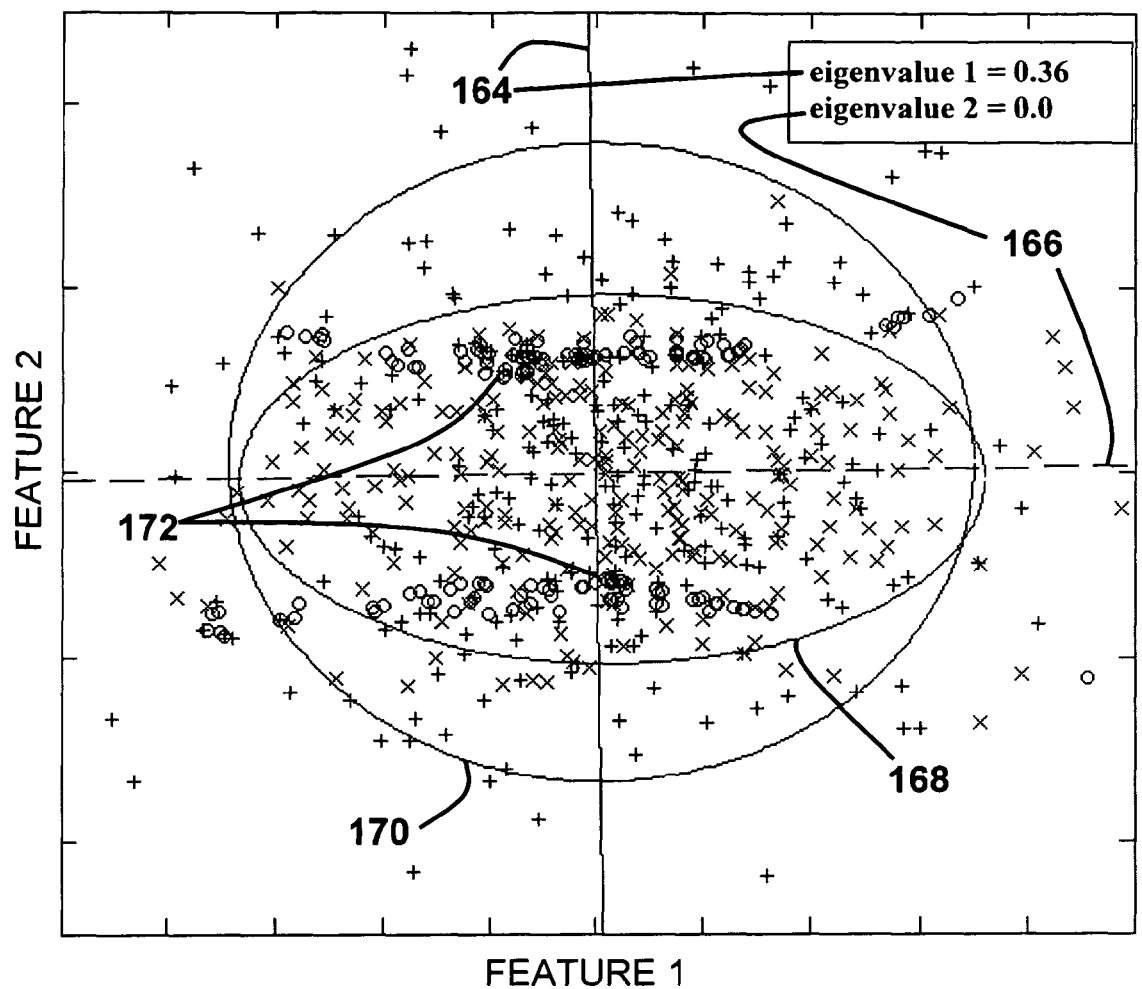
Figure 14B:
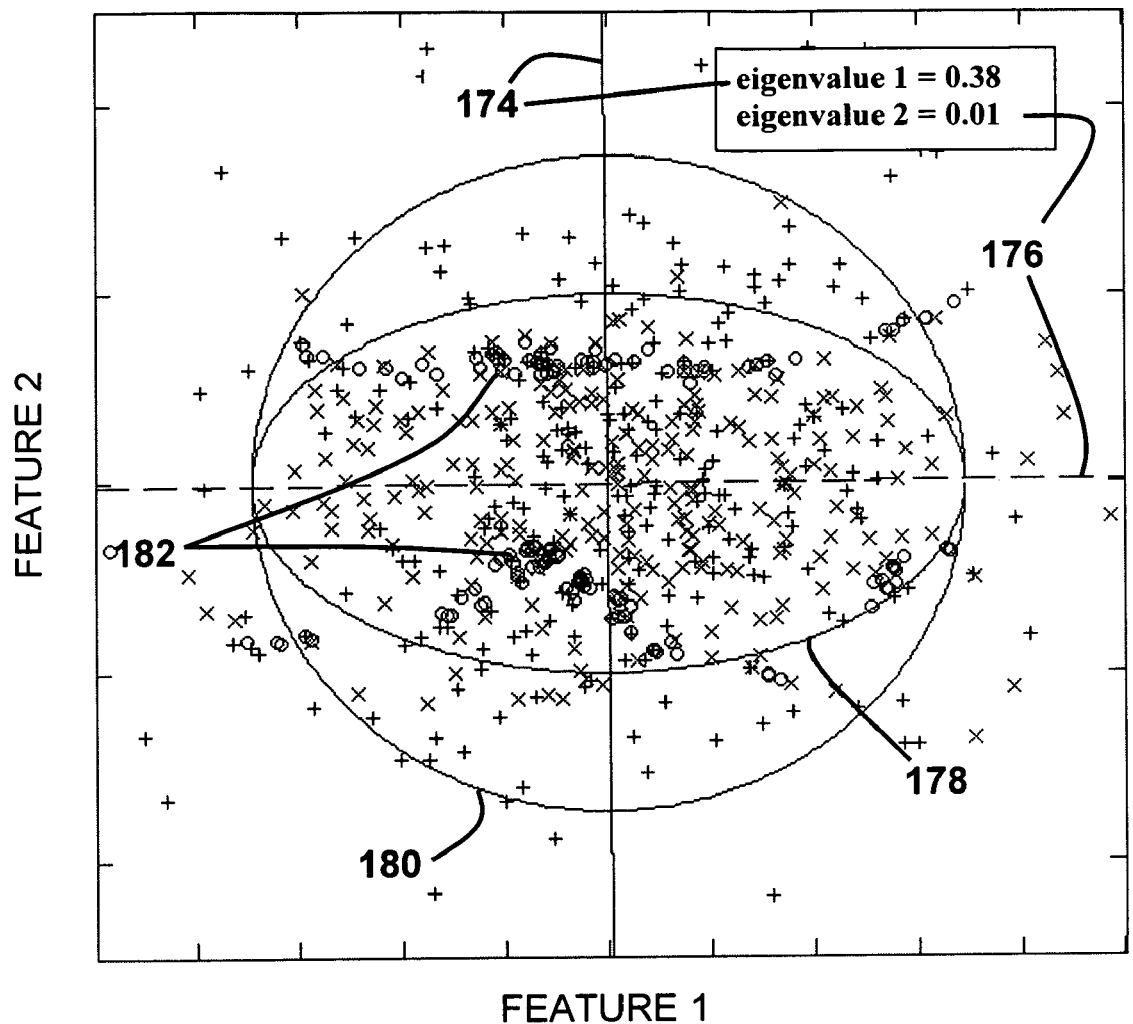
Figure 15:
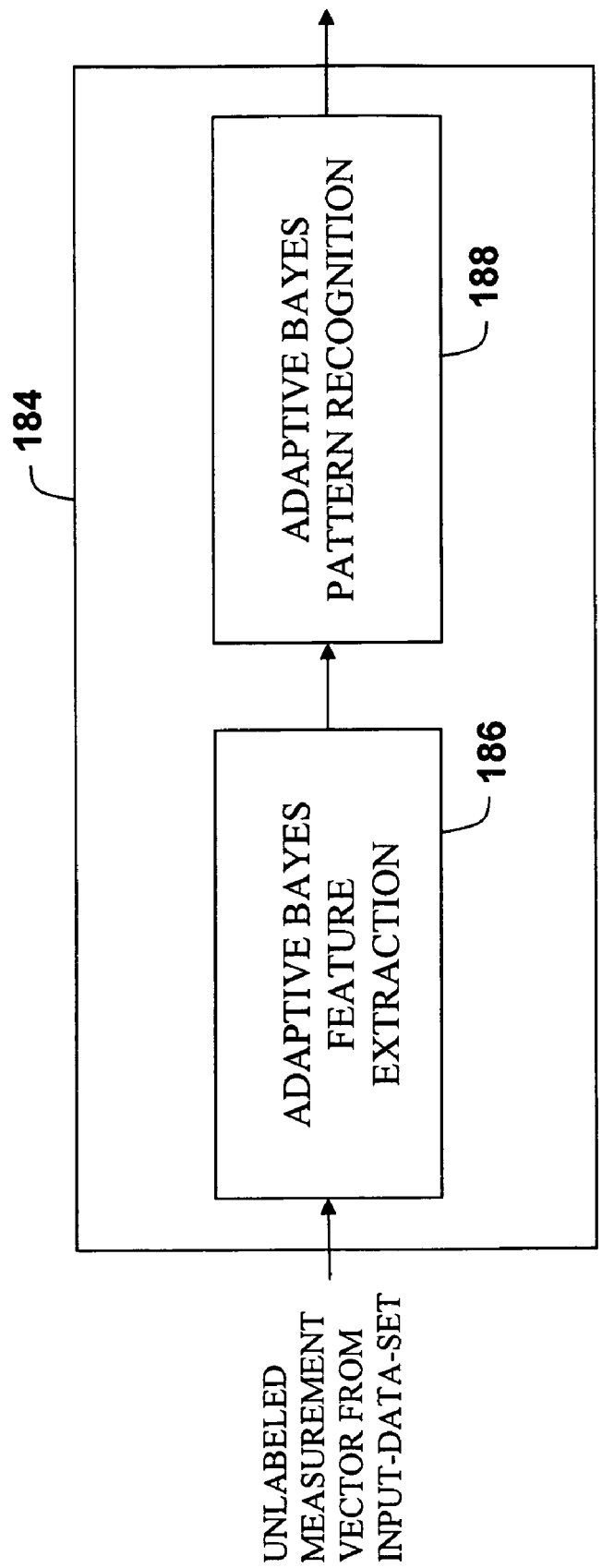

FIGS. 11A to 11D show Test Case 1 results from application of the first and second embodiment of the Adaptive Bayes Feature Extraction system using simulated data FIGS. 12A to 12D show Test Case 2 results from application of the first and second embodiment of the Adaptive Bayes Feature Extraction system using simulated data FIGS. 13A to 13D show Test Case 3 results from application of the first and second embodiment of the Adaptive Bayes Feature Extraction system using simulated data FIGS. 14A to 14D show Test Case 4 results from application of the first and second embodiment of the Adaptive Bayes Feature Extraction system using simulated data FIG. 15 is the processing flow diagram for a pattern recognition system architecture that exploits the capabilities provided by the Adaptive Bayes Feature Extraction system and method.

DRAWINGS - REFERENCE NUMERALS

| | |
|---|---|
| 10 | class-of-interest error ellipse |
| 12 | class-other error ellipse |
| 14 | decision boundary |
| 16 | normal to decision boundary |
| 18 | class-of-interest error ellipse |
| 20 | class-other error ellipse |
| 22 | quadratic decision boundary |
| 24 | normal vector to decision boundary |
| 26 | class-of-interest error ellipse and simulated data |
| 28 | class-other error ellipse and simulated data |
| 30 | decision boundary |
| 32 | effective decision boundaries |
| 34 | class-of-interest error ellipse and simulated data |
| 36 | class-other error ellipse and simulated data |
| 38 | decision boundary |
| 40 | effective decision boundary |
| 42 | class-of-interest error ellipse and samples classified as class-of-interest |
| 44 | class-other error ellipse and samples classified as class-other |
| 46 | decision boundary |
| 48 | vectors connecting samples on opposite sides of the decision boundary |
| 50 | normal vectors to decision boundary |
| 52 | class-of-interest error ellipse |
| 54 | class-other error ellipse |
| 56 | decision boundary |
| 58 | points on decision boundary used to calculated normal vectors to decision boundary |
| 60 | processing flow diagram for the Adaptive Bayes Feature Extraction system |
| 62 | user interface device |
| 64 | memory |
| 66 | training module |
| 68 | processing unit |
| 70 | output device |
| 72 | feature extraction module |
| 74 | module for approximating adaptive Bayes decision boundary using polynomial |
| 76 | module for classifying data-set and extracting a set of samples located near the decision boundary |
| 78 | module for locating a set of points on the decision boundary |
| 80 | module for calculating normal vectors to the decision boundary |
| 82 | module for calculating the effective decision boundary feature matrix |
| 84 | module for calculating the eigenvalues and eigenvectors for the effective decision boundary matrix |
| 86 | module for selection of eigenvectors for use in feature extraction |
| 88 | module for extracting features from measurement vectors |
| 90 | module for calculating smoothing parameter for Parzen kernels |
| 92 | module for approximating the adaptive Bayes decision boundary using Parzen kernels |
| 94 | module for classifying the input-data-set and extracting samples located near the decision boundary |
| 96 | module for locating a set of points on the decision boundary |
| 98 | module for calculating normal vectors to the decision boundary |
| 100 | module for calculating the effective decision boundary feature matrix |
| 102 | module for calculating the eigenvalues, eigenvectors, and rank of the effective decision boundary feature matrix |
| 104 | eigenvector 1 and eigenvalue 1 |
| 106 | eigenvector 2 and eigenvalue 2 |
| 108 | class-of-interest error ellipse and simulated data |
| 110 | class-other error ellipse and simulated data |
| 112 | points on decision boundary used to calculate normal vectors |
| 114 | eigenvector 1 and eigenvalue 1 |
| 116 | eigenvector 2 and eigenvalue 2 |
| 118 | class-of-interest error ellipse and simulated data |
| 120 | class-other error ellipse and simulated data |
| 122 | points on decision boundary used to calculate normal vectors |
| 124 | eigenvector 1 and eigenvalue 1 |
| 126 | eigenvector 2 and eigenvalue 2 |
| 128 | class-of-interest error ellipse and simulated data |
| 130 | class-other error ellipse and simulated data |
| 132 | points on decision boundary used to calculate normal vectors |
| 134 | eigenvector 1 and eigenvalue 1 |
| 136 | eigenvector 2 and eigenvalue 2 |
| 138 | class-of-interest error ellipse and simulated data |
| 140 | class-other error ellipse and simulated data |
| 142 | points on decision boundary used to calculate normal vectors |
| 144 | eigenvector 1 and eigenvalue 1 |
| 146 | eigenvector 2 and eigenvalue 2 |
| 148 | class-of-interest error ellipse and simulated data |
| 150 | class-other error ellipse and simulated data |
| 152 | points on decision boundary used to calculate normal vectors |

-continued

DRAWINGS - REFERENCE NUMERALS

| | |
|---|---|
| 154 | eigenvector 1 and eigenvalue 1 |
| 156 | eigenvector 2 and eigenvalue 2 |
| 158 | class-of-interest error ellipse and simulated data |
| 160 | class-other error ellipse and simulated data |
| 162 | points on decision boundary used to calculate normal vectors |
| 164 | eigenvector 1 and eigenvalue 1 |
| 166 | eigenvector 2 and eigenvalue 2 |
| 168 | class-of-interest error ellipse and simulated data |
| 170 | class-other error ellipse and simulated data |
| 172 | points on decision boundary used to calculate normal vectors |
| 174 | eigenvector 1 and eigenvalue 1 |
| 176 | eigenvector 2 and eigenvalue 2 |
| 178 | class-of-interest error ellipse and simulated data |
| 180 | class-other error ellipse and simulated data |
| 182 | points on decision boundary used to calculate normal vectors |
| 184 | flow diagram of a pattern recognition system architecture that exploits the capabilities provided by the Adaptive Bayes Feature Extraction system |
| 186 | Adaptive Bayes Feature Extraction module |
| 188 | adaptive Bayes pattern recognition module |

DETAILED DESCRIPTION—FIG. 7

Figure 1:
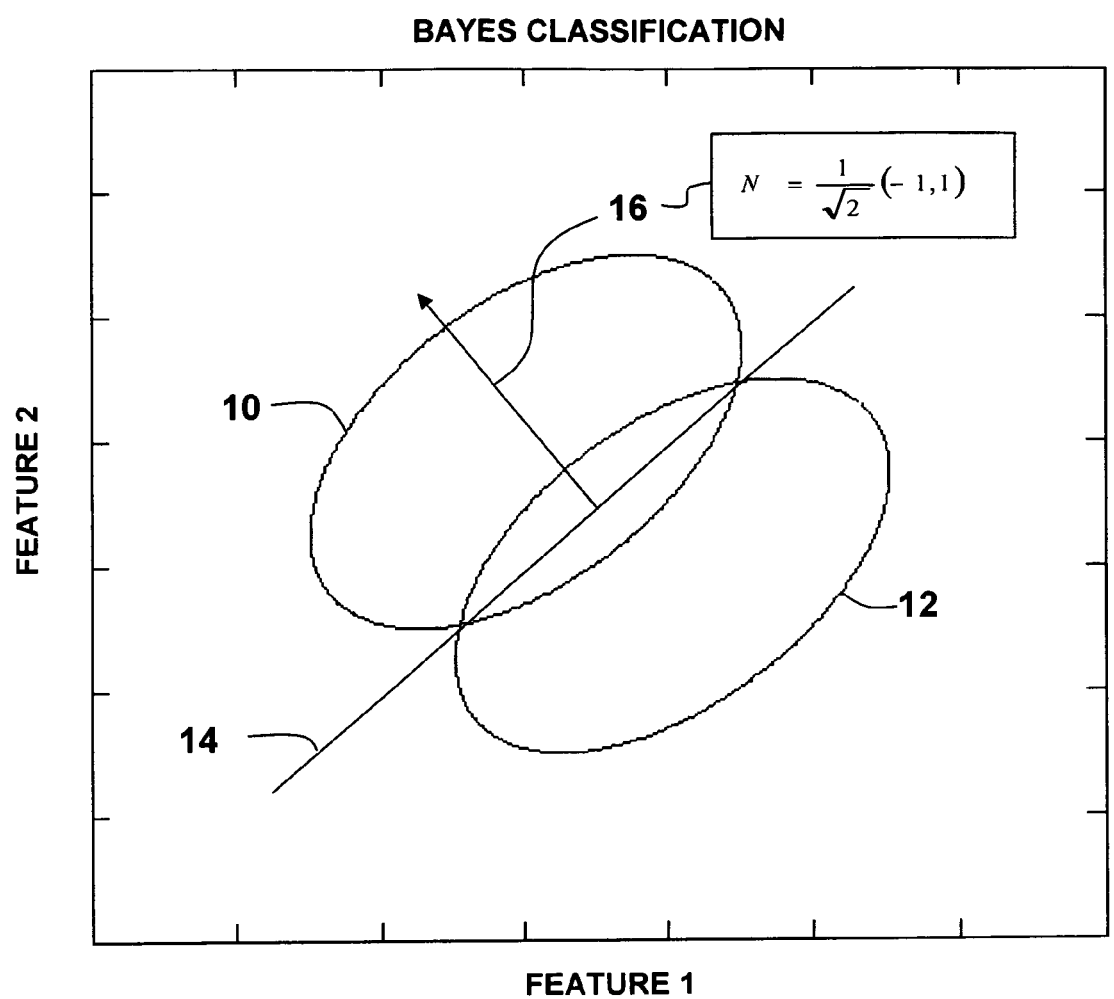
FIG. 1 is a plot illustrating an example of the decision boundary for two classes where the covariance matrices are equal. Also shown is a unit normal vector to the decision boundary which is the primary discriminant feature vector for this example.
Figure 2:
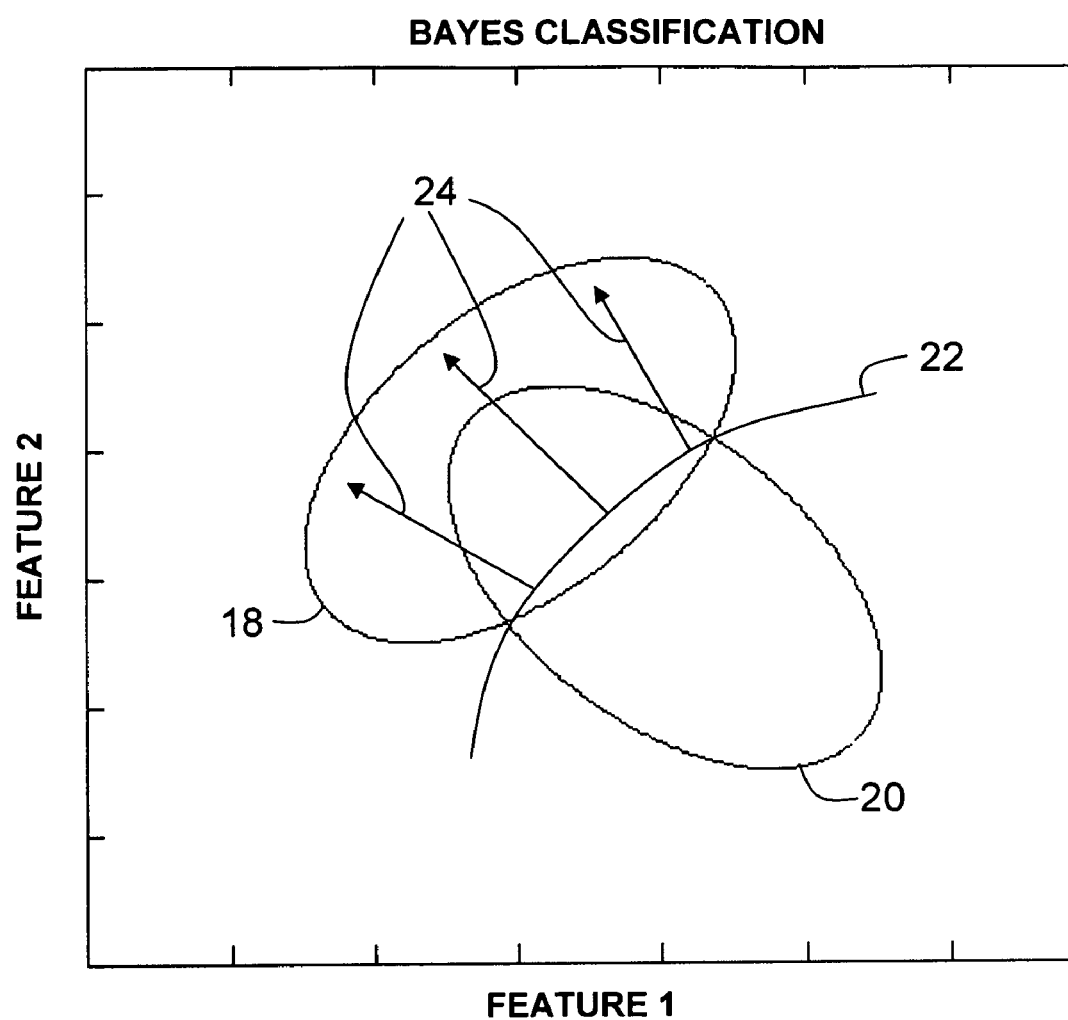
FIG. 2 is a plot illustrating the quadratic decision boundary produce by two distributions with unequal covariance. Also shown are the unit normals to this decision boundary which vary in direction, implying that two features are needed to achieve the same classification accuracy as in the original feature space.
Figure 3:
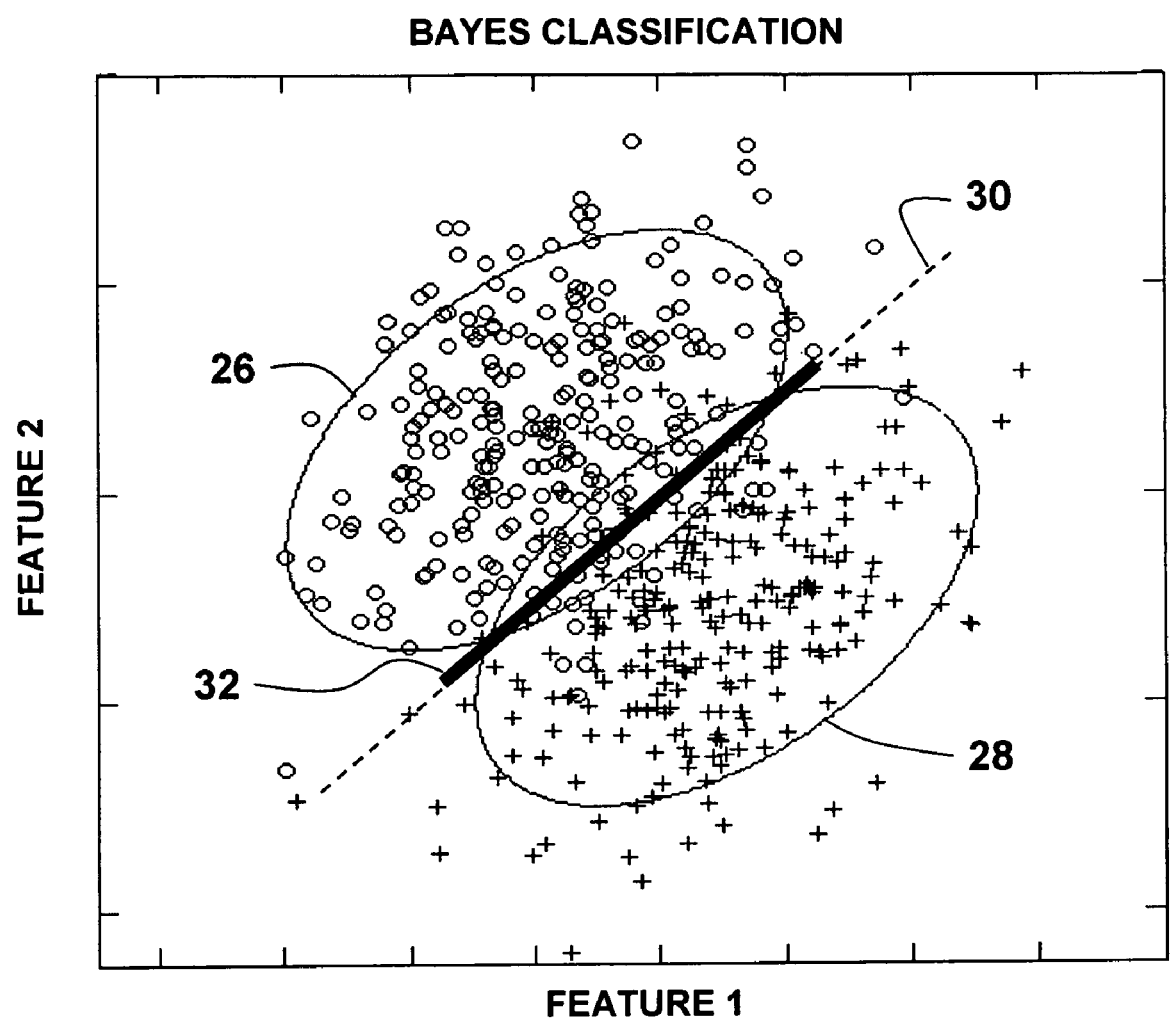
FIG. 3 is a plot illustrating the concept of effective decision boundaries for two distributions with equal covariance matrices. The effective decision boundary is the intersection of the decision boundary with the region where most of the data is located.
Figure 4:
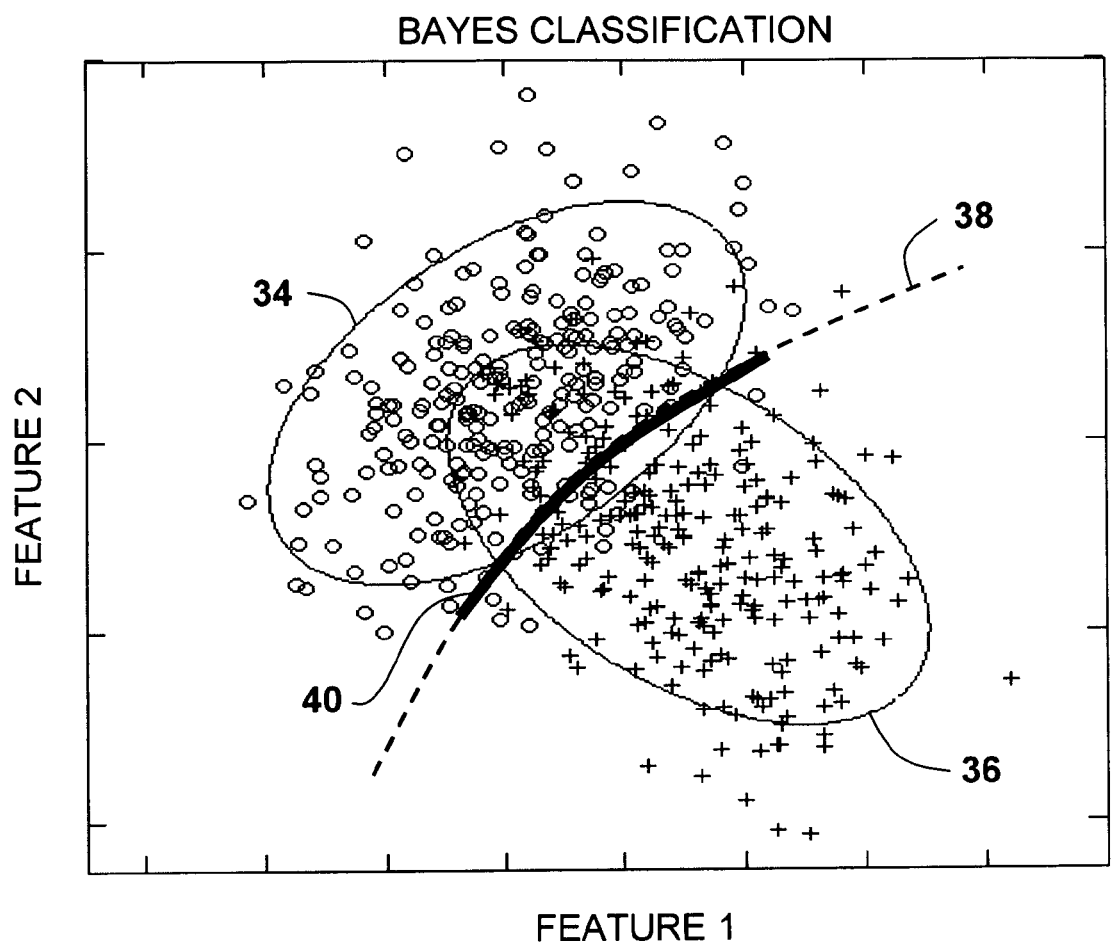
FIG. 4 is a plot illustrating the concept of effective decision boundaries for two distributions with unequal covariance matrices. Again, the effective decision boundary is the intersection of the decision boundary with the region where most of the data is located.
Figure 5:
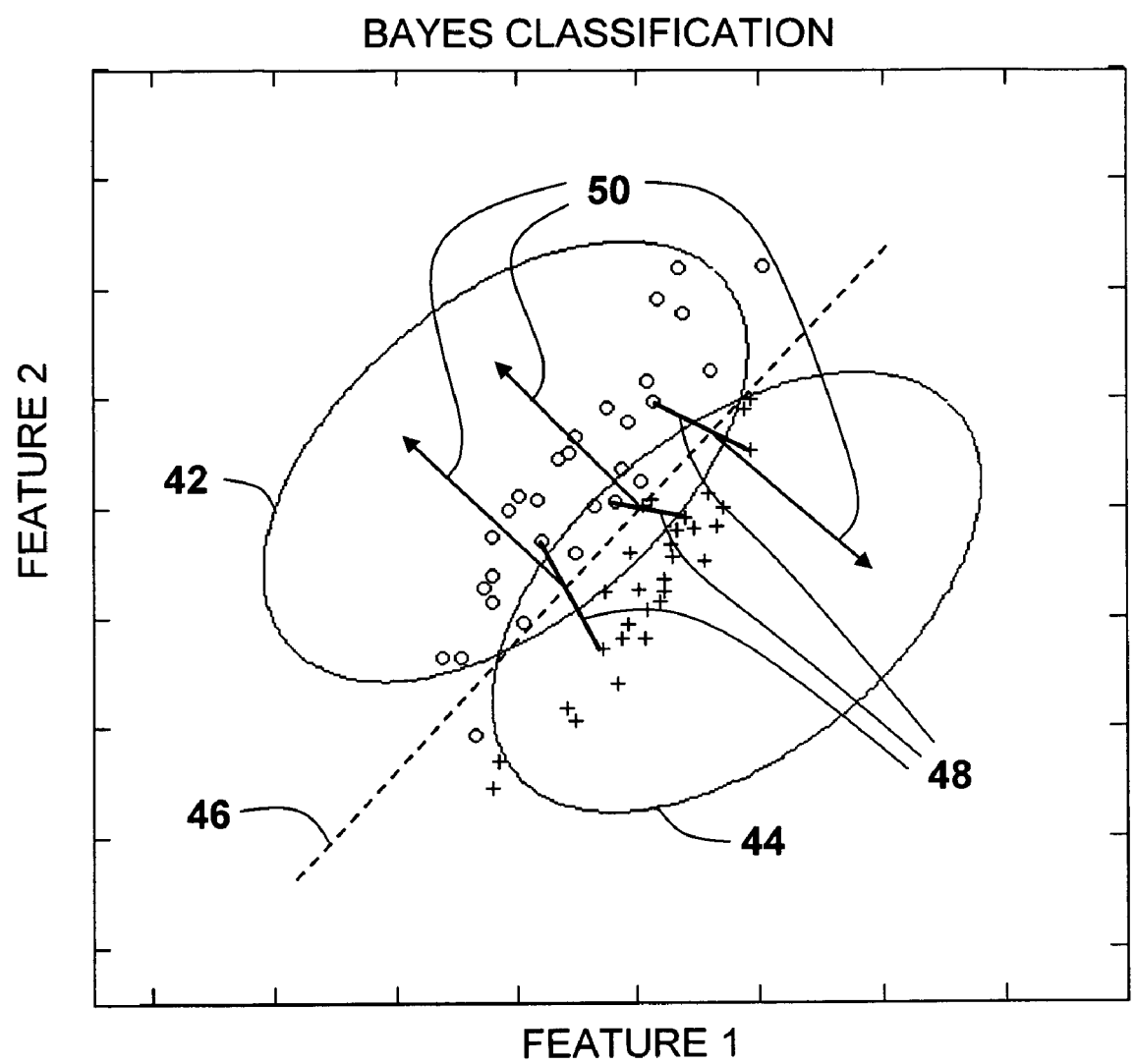
FIG. 5 is a plot illustrating the procedure used to find points on the effective decision boundary feature and the calculation of normals to the decision boundary at those points.
Figure 6:
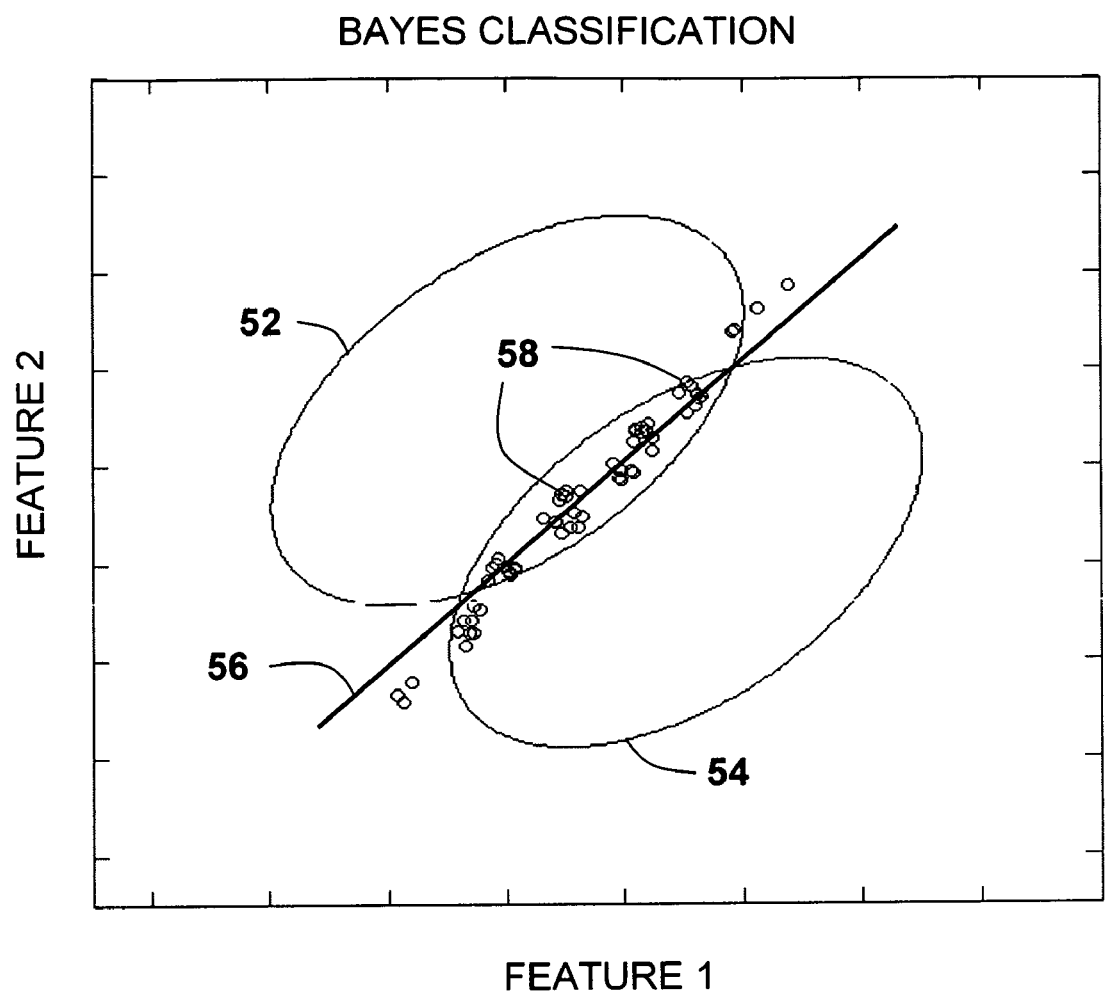
FIG. 6 is a plot showing an actual example of the application of the boundary finding procedure which finds points on the decision boundary. These points are used to calculate normals to the decision boundary.
Figure 7:
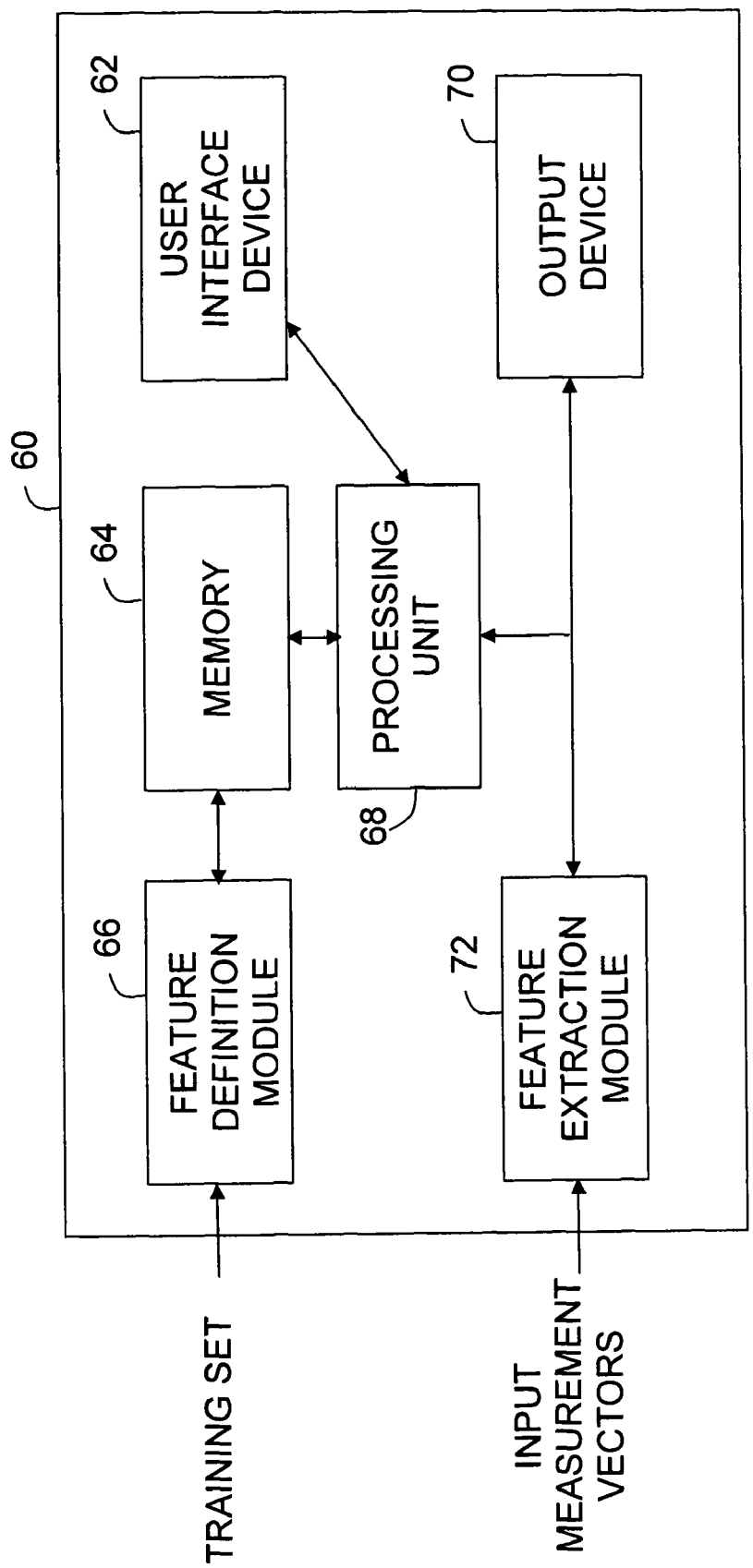
FIG. 7 is a block diagram for an Adaptive Bayes Feature Extraction system, including its components, for the preferred embodiment.

With reference to FIG. 7, an Adaptive Bayes Feature Extraction system 60 is defined comprised of a feature definition module 66, a processing unit 68, memory 64, a user interface device 62, an output device 70, and a feature extraction module 72,. The Adaptive Bayes Feature Extraction system operates to extract optimal features for discriminating between two classes, a class-of-interest and a class-other, where the members of the two classes can be represented in measurement vectors. The Adaptive Bayes Feature Extraction system can be used in pattern recognition applications where 1) there is a need to effectively represent the informational content of measurements while reducing dimensionality and 2) where training samples or otherwise, are provided a priori only for the class-of-interest. Applications include extracting features from high dimensional data sources such as: 1) high-spectral resolution imaging sensors; 2) concatenated data from multiple sensors; 3) data integrated from multiple data models; 4) data mining; and 5) representations of data in two or three dimensions to aid in visual exploration of data [A. K. Jain, R. W. Duin, and J. Mao, "Statistical Pattern Recognition: A Review", IEEE transactions on Pattern Analysis and Machine Intelligence, vol. 22, no. 1, pp. 14, January 2000].

Two embodiments of the Adaptive Bayes Feature Extraction system are described below. Both embodiments use the system and method presented in FIG. 7. The primary difference between the embodiments is the off-line method use to define the Bayes decision boundary and the method used to construct normal vectors to this decision boundary. Both embodiments use the same on-line method for feature extraction, shown in FIG. 9.

Figure 8:
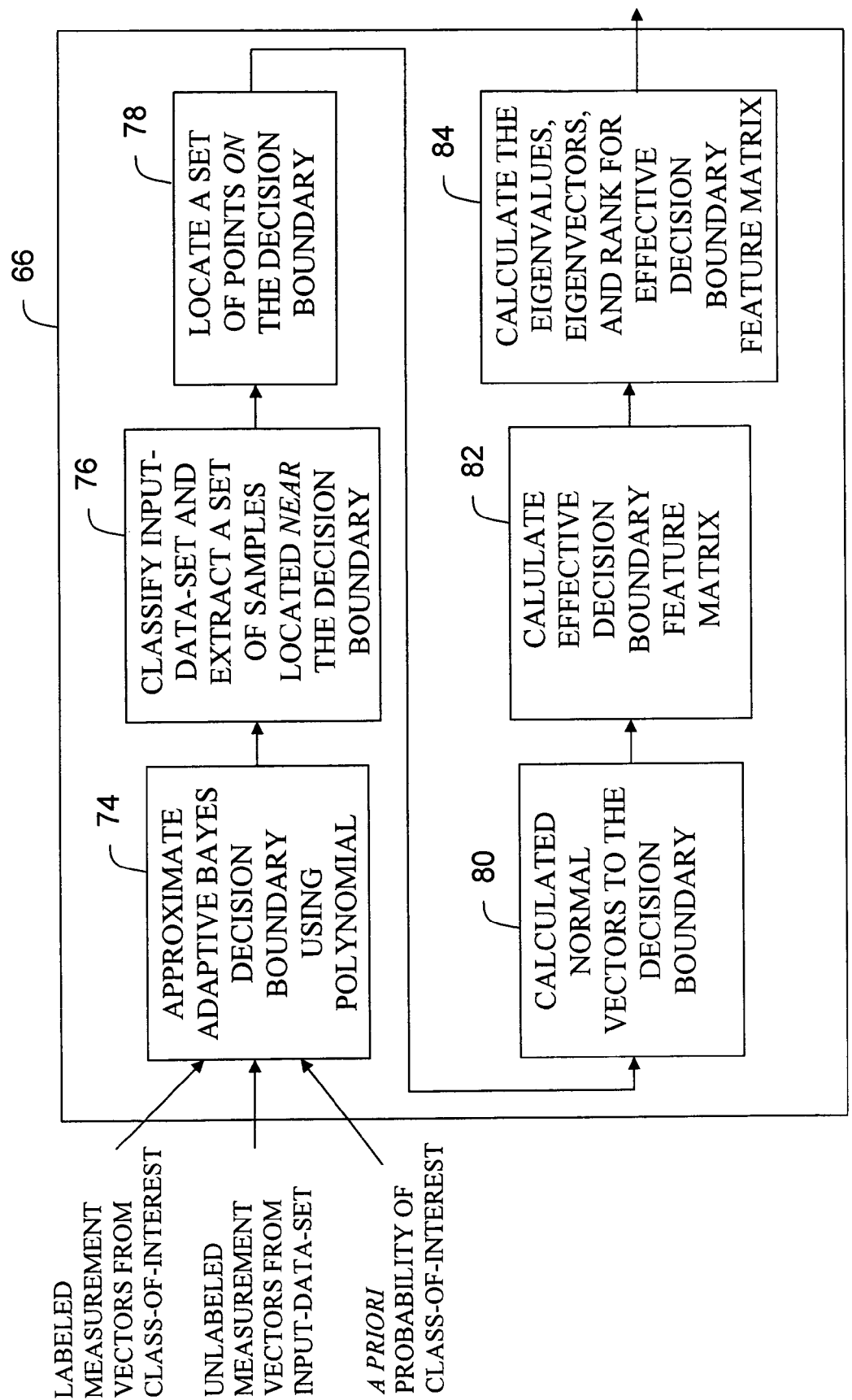
FIG. 8 is the processing flow diagram for the off-line training module for the first embodiment of the Adaptive Bayes Feature Extraction system.
Figure 9:
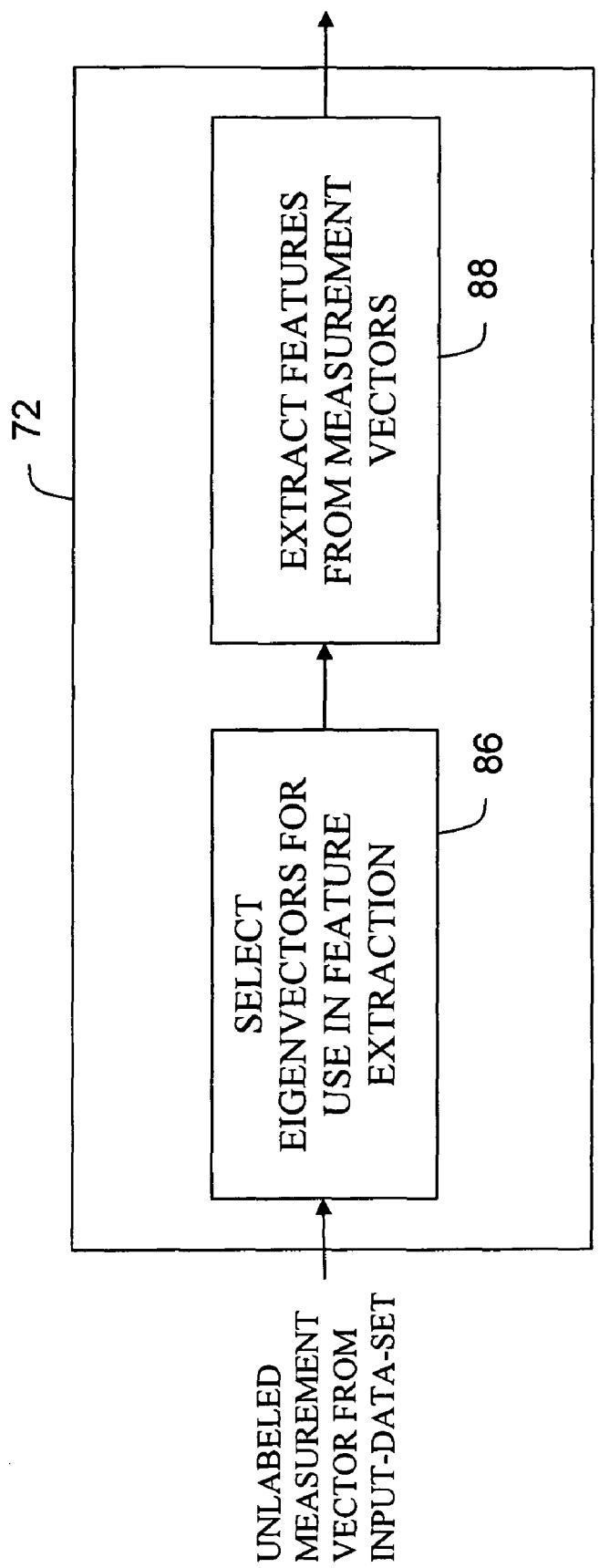
FIG. 9 is the processing flow for the on-line feature extraction module for the first and second embodiments of the Adaptive Bayes Feature Extraction system.

Detailed Description—First Embodiment—FIGS. 8 and 9

The first embodiment of the Adaptive Bayes Feature Extraction system and method uses a polynomial to approximate the class-of-interest posterior distribution function and define the Bayes decision boundary. The first embodiment consists of an off-line process and an on-line process. These two processes are described below.

Off-Line Processing—First Embodiment

FIG. 8, shows the flow diagram of the off-line training process for calculating optimal features for discriminating between two classes, a class-of-interest and a class-other using a least squares approximation of adaptive Bayes decision boundary using a polynomial.

Referencing FIG. 8, the off-line process begins with step 74 where the class-of-interest posterior distribution function $\hat{P}(C_{int}/X)$ is approximated using a polynomial. Any order polynomial may be used; however the procedure is illustrated below using a second order polynomial of the form $$\hat{P}(C_{int}/X) \approx a_0 + a_1 x_1 + a_2 x_2 + a_3 x_1 x_2 + a_4 x_1^2 + a_5 x_2^2 \tag{69}$$

or using vector notation $$\hat{P}(C_{int}/X) \approx A^T F(X) \tag{70}$$

where $$A = (a_0, a_1, a_2, a_3, a_4, a_5)^T \tag{71}$$

and $$F(X) = (1, x_1, x_2, x_1 x_2, x_1^2, x_2^2) \tag{72}$$

Given a set of N unlabeled samples $(X_1, X_2, \ldots X_N)$ from the data set to be classified and M labeled samples from the class-of-interest, $(X_1(C_{int}), X_2(C_{int}), \ldots X_M(C_{int}))$ the parameter vector A are estimated as follows:

$$A = P_{C_{int}} \left[ \frac{1}{N} \sum_{i=1}^{N} (F(X_i) F(X_i)^T) \right]^{-1} \cdot \frac{1}{M} \sum_{j=1}^{M} [F(X_j(C_{int}))] \tag{73}$$

where the a priori probability of the class-of-interest, $P_{C_{int}}$, is assume to be known.

Referencing FIG. 8, the next step 76, classifies patterns from the input-data-set as class-of-interest or as class-other, using the adaptive Bayes decision rule and $A^T F(X)$ derived in step 74 or If: $A^T F(X) \geq \frac{1}{2}$, (74)

Classify X as class-of-interest
Otherwise classify X as class-other
where eq. (22) has been substituted for $\hat{P}(C_{int}/X)$, in eq. (9).

Again referencing FIG. 8, also in step 76 a subset of the classified samples that lie near the decision boundary is identified. This is accomplished using the following criterion.

If $|A^T F(X) - \frac{1}{2}| < t$, (75)

Identify "X" as laying "near" the decision boundary
where the threshold "t" is selected using histogramming techniques to ensure that a predetermined percent of samples near the decision boundary are identified.

Referencing FIG. 8, in step 78, for each sample $X_{int}$ near the decision boundary classified as class-of-interest, locate the nearest sample on the other side of the decision boundary classified as class-other, or $X_{other}$. Since $X_{int}$ and $X_{other}$ are on different sides of the decision boundary, the point $X_0$, (the point where the line connecting $X_{int}$ and $X_{other}$ passes through the decision boundary) is given by $$X_0 = \mu V + V_0 \tag{76}$$

where $$V_0 = X_{int} \tag{77}$$

$$V = X_{other} - X_{int} \tag{78}$$

The point, $X_0$, is found by incrementing $\mu$, eq. (76), to find the point where $$A^T F(X) - \frac{1}{2} = 0 \tag{79}$$

Again referencing FIG. 8, in step 78, for each sample $X_{other}$ near the decision boundary classified as class-other, locate the nearest sample on the other side of the decision boundary classified as class-of-interest, or $X_{int}$. Since $X_{other}$ and $X_{int}$ are on different sides of the decision boundary, the point $X_0$, (the point where the line connecting $X_{other}$ and $X_{int}$ passes through the decision boundary) is located by incrementing μ, eq. (76).

Referencing FIG. 8, in step 80 a unit normal vector is computed at each decision boundary point $X_0$ using the gradient operator.

$$N = \nabla h(X) = \frac{\delta h(X)}{\delta X} = \begin{bmatrix} \frac{\delta h(X)}{\delta x_1} \\ \vdots \\ \frac{\delta h(X)}{\delta x_d} \end{bmatrix} \quad (80)$$

where $$h(X) = A^T F(X) - \frac{1}{2} \quad (81)$$

Assuming $A^T F(X)$ is a second order polynomial approximation of class-of-interest posterior distribution function $\hat{P}(C_{int}/X)$ and the number of dimensions, d=2, then $$A^T F(X) = a_0 + a_1 x_1 + a_2 x_2 + a_3 x_1 x_2 + a_4 x_1^2 + a_5 x_2^2 \quad (82)$$

Then the normal at $X_0$, is $$N = \begin{bmatrix} \frac{\delta A^T F(X)}{\delta x_1} \\ \vdots \\ \frac{\delta A^T F(X)}{\delta x_d} \end{bmatrix}_{X=X_0} \quad (83)$$

and $$N = \begin{bmatrix} a_1 + a_3 x_2 + 2 a_4 x_1 \\ a_2 + a_3 x_1 + 2 a_5 x_2 \end{bmatrix}_{X=X_0} \quad (84)$$

N is then normalized to be a unit vector $$N = \frac{N}{|N|} \quad (85)$$

Referencing FIG. 8, in step 82 the normal vectors to the decision boundary, calculated in step 80, are averaged to estimate the effective decision boundary feature matrix, $M_{EDBFM}$, where $$M_{EDBFM} = \frac{1}{L} \sum_{i=1}^{L} N_i N_i^T \quad (86)$$

where L is the number of unit normals calculated in step 80.

Referencing FIG. 8, in step 84 the eigenvalues, eigenvectors, and the rank of the effective decision boundary matrix, $M_{EDBFM}$ are calculated. The square matrix $M_{EDBFM}$, is evaluated to find d orthogonal eigenvectors v and associated eigenvalues λ, that satisfy the relation $$M_{EDBF} \cdot v = \lambda \cdot v \quad (87)$$

where d is the number of dimensions of the original space.

The eigenvectors of $M_{EDBFM}$ provide the feature extraction vectors. The eigenvalues of $M_{EDBFM}$ provide an indication of the amount of discrimination provided by the eigenvectors. The eigenvalues of $M_{EDBFM}$ are a vector $$\Lambda = \begin{bmatrix} \lambda_1 \\ \vdots \\ \lambda_d \end{bmatrix} \quad (88)$$

and the eigenvectors of $M_{EDBFM}$ are a matrix $$V = \begin{bmatrix} v_{1,1} & \cdots & v_{d,1} \\ \vdots & \ddots & \vdots \\ v_{1,d} & \cdots & v_{d,d} \end{bmatrix} \quad (89)$$

The rank of $M_{EDBFM}$ is defined as the order of the highest order, non-vanishing determinant, within the $M_{EDBFM}$ matrix. The rank of $M_{EDBFM}$ is also the smallest dimension where the same classification can be obtained as in the original space.

On-Line Processing—First Embodiment—FIG. 9

With reference to FIG. 9, the on-line processing begins with step 86 where the rank of the effective decision boundary matrix, $M_{EDBFM}$ is examined to determine the number of features to be extracted from the input-data-set measurements. If the rank of $M_{EDBFM}$ is less than the number of dimensions in the original space, eigenvectors with near-zero eigenvalues are removed from the eigenvector matrix of $M_{EDBFM}$ to produce a new eigenvector matrix $V_R$ with reduce number of columns or $$V_R = \begin{bmatrix} v_{1,1} & \cdots & v_{R,1} \\ \vdots & \ddots & \vdots \\ v_{1,d} & \cdots & v_{R,d} \end{bmatrix} \quad (90)$$

where R is the number of eigenvectors in the reduced matrix $V_R$.

The number of columns in matrix $V_R$ is normally equal to the rank of $M_{EDBFM}$. However if further feature reduction is desired, those eigenvectors with eigenvalues lower than some predetermined threshold may be removed from $V_R$ to further reduce dimensionality.

Again with reference to FIG. 9, in step 88, the measurement vectors from the input-data-set are processed to provide a new measurement vector Y with reduce dimensionality where $$Y = V_R^T \cdot X \quad (91)$$

In eq. (91), Y is the reduced dimension measurement vector, $V_R$ is the reduced matrix of eigenvectors, and X is a measurement vector from the input-data-set.

Figure 10:
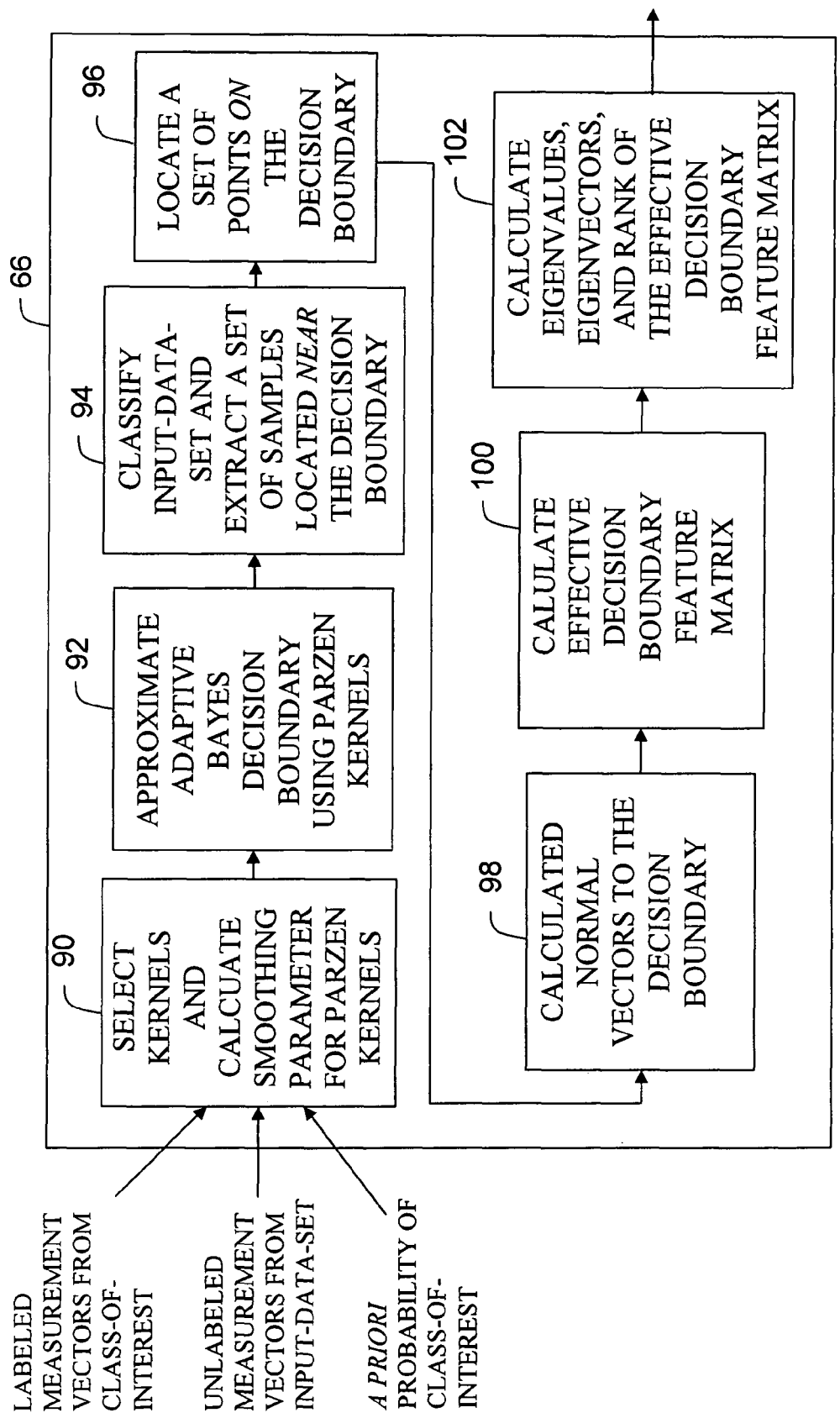
FIG. 10 is the processing flow diagram for the off-line training module for the second embodiment of the Adaptive Bayes Feature Extraction system.

Description—Second Embodiment—FIGS. 9 and 10

The second embodiment of the Adaptive Bayes Feature Extraction system uses Parzen kernels to approximate the class-of-interest posterior distribution function and define the Bayes decision boundary. The second embodiment consists of an off-line process and an on-line process. These two processes are described below.

Off-Line Processing—Second Embodiment

FIG. 10, shows the flow diagram of the off-line training process for calculating optimal features for discriminating between two classes, a class-of-interest and a class-other, using a least squares approximation of adaptive Bayes classifier and decision boundary using Parzen kernels.

Referencing FIG. 10, the off-line process begins with step 90. First, a set of random samples, $S=\{X_1, \ldots X_R\}$, are selected for the input-data-set for use as the means of the kernels, $P(X/k_i)$, eq. (36).

Next, in step 90, the smoothing parameter, H, for the Parzen kernels is calculated using eq. (50), or $$\hat{H} = \sum_{j=1}^{N} \sum_{i=1}^{R} \frac{P_{k_i} \cdot P(X_j/k_i)}{P(X_j)} \cdot \left[\frac{1}{2}(X_j - X_i)(X_j - X_i)^T\right] \qquad (92)$$

Given an initial value of $H_0$, an updated value is obtained for H using eq. (92). The log likelihood function, eq. (48), is evaluated after each update to H. This process is repeated until there is no further change in the log likelihood function, eq. (48).

Referencing FIG. 10, in step 92 the class-of-interest posterior distribution function $\hat{P}(C_{int}/X)$ is approximated using the function $A^T F(X)$ where $$\hat{P}(C_{int}/X) \cong A^T F(X) \qquad (93)$$

and $A^T F(X)$ is the Parzen kernel estimator, eq. (43), or $$A^T F(X) = \sum_{i=1}^{M} a_i \frac{P(X/k_i)}{P(X)} \qquad (94)$$

Given a set of N unlabeled samples $(X_1, X_2, \ldots X_N)$ from the data set to be classified and M labeled samples from the class-of-interest, $(X_1(C_{int}), X_2(C_{int}), \ldots X_M(C_{int}))$ the parameter weighting vector A is, eq. (29), estimated as follows:

$$A = P_{C_{int}} \left[\frac{1}{N}\sum_{i=1}^{N}(F(X_i)F(X_i)^T)\right]^{-1} \cdot \frac{1}{M}\sum_{j=1}^{M}[F(X_j(C_{int}))] \qquad (95)$$

where the a priori probability of the class-of-interest, $P_{C_{int}}$, is assume to be known.

Again referencing FIG. 10, the next step 94, classifies patterns from the input-data-set as class-of-interest or as class-other, using the adaptive Bayes decision rule, eq. (9), and $A^T F(X)$ derived in step 92 or If: $A^T F(X) \geq \frac{1}{2}$, (96)

Classify X as class-of-interest
Otherwise classify X as class-other
where eq. (22) has been substituted for $\hat{P}(C_{int}/X)$, in eq. (9).

Again referencing FIG. 10, in step 94 a subset of the classified samples that lie near the decision boundary is identified. This is accomplished using the following criterion.

If $|A^T F(X) - \frac{1}{2}| < t$, (97)

Identify "X" as laying "near" the decision boundary
The threshold "t" is selected using histogramming techniques to ensure that a predetermined percent of samples near the decision boundary are identified.

Referencing FIG. 10, in step 96, for each sample $X_{int}$ near the decision boundary classified as class-of-interest, locate the nearest sample on the other side of the decision boundary classified as class-other, or $X_{other}$. Since $X_{int}$ and $X_{other}$ are on different sides of the decision boundary, the point $X_0$, (the point where the line connecting $X_{int}$ and $X_{other}$ passes through the decision boundary) is given by $$X_0 = \mu V + V_0 \qquad (98)$$

where $$V_0 = X_{int} \qquad (99)$$

$$V = X_{other} - X_{int} \qquad (100)$$

The point, $X_0$, is found by incrementing $\mu$, eq. (98), to find the point where $$A^T F(X) - \frac{1}{2} = 0 \qquad (101)$$

Again referencing FIG. 10, in step 96, for each sample $X_{other}$ near the decision boundary classified as class-other, locate the nearest sample on the other side of the decision boundary classified as class-of-interest, or $X_{int}$. Since $X_{other}$ and $X_{int}$ are on different sides of the decision boundary, the point $X_0$ (the point where the line connecting $X_{other}$ and $X_{int}$ passes through the decision boundary) is located by incrementing $\mu$, eq. (98).

Referencing FIG. 10, in step 98 a unit normal vector is computed at each decision boundary point, $X_0$, using the gradient operator.

$$N = \nabla h(X) = \frac{\delta h(X)}{\delta X} \qquad (102)$$

where $$h(X) = A^T F(X) - \frac{1}{2} \qquad (103)$$

The function $A^T F(X)$ is the Parzen kernel approximation of class-of-interest posterior distribution function, $\hat{P}(C_{int}/X)$, eq. (94), or $$A^T F(X) = \sum_{i=1}^{M} a_i \frac{P(X/k_i)}{P(X)} \qquad (104)$$

Then the normal at $X_0$, is $$N = \nabla (A^T F(X) - \frac{1}{2})|_{X = X_0} \qquad (105)$$

or $$N = \frac{\delta A^T F(X)}{\delta X}\bigg|_{X = X_0} \qquad (106)$$

Taking the partial of $A^T F(X)$ in eq. (104), we get $$\frac{\delta A^T F(X)}{\delta X} = \frac{\delta}{\delta X}\left(\sum_{i=1}^{M} a_i \frac{P(X/k_i)}{P(X)}\right) \quad (107)$$

$$\frac{\delta A^T F(X)}{\delta X} = \frac{1}{P(X)^2}\left[P(X) \cdot \sum_{i=1}^{M} a_i \frac{\delta P(X/k_i)}{\delta X} - \sum_{i=1}^{M} a_i P(X/k_i) \cdot \frac{\delta P(X)}{\delta(X)}\right] \quad (108)$$

$$\frac{\delta A^T F(X)}{\delta X} = \frac{1}{P(X)^2}\left[P(X) \cdot \sum_{i=1}^{M} a_i \frac{\delta P(X/k_i)}{\delta X} - \sum_{i=1}^{M} a_i P(X/k_i) \cdot \frac{1}{M}\sum_{i=1}^{M} \frac{\delta P(X/k_i)}{\delta X}\right] \quad (109)$$

$$\frac{\delta P(X/k_i)}{\delta X} = \frac{\delta}{\delta X}\left(\frac{1}{2\pi^{d/2} \cdot |H|^{1/2}} \cdot e^{-1/2 \cdot (X-X_i)^T H^{-1}(X-X_i)}\right) \quad (110)$$

$$\frac{\delta P(X/k_i)}{\delta X} = -\frac{1}{2} \cdot P(X/k_i) \cdot \frac{\delta Q}{\delta X} \quad (111)$$

where $$Q = (X-X_i)^T H^{-1}(X-X_i) \quad (112)$$

and $$\frac{\delta Q}{\delta X} = \frac{\delta}{\delta X}((X-X_i)^T H^{-1}(X-X_i)) \quad (113)$$

$$\frac{\delta Q}{\delta X} = 2H^{-1}(X-X_i) \quad (114)$$

Substituting eq. (114) into eq. (111), we get $$\frac{\delta P(X/k_i)}{\delta X} = -P(X/k_i) \cdot H^{-1}(X-X_i) \quad (115)$$

Substituting eq. (115) into eq. (109), we get $$\frac{\delta A^T F(X)}{\delta X} = \frac{1}{P(X)^2}\left[-P(X) \cdot \sum_{i=1}^{M} a_i P(X/k_i) \cdot H^{-1}(X-X_i) + \quad (116)$$

-continued $$\sum_{i=1}^{M} a_i P(X/k_i) \cdot \frac{1}{M}\sum_{i=1}^{M} P(X/k_i) \cdot H^{-1}(X-X_i)\right]$$

And finally, the normal to the decision boundary can be estimated at some point $X_0$ using $$N = \frac{1}{P(X)^2}\left[-P(X) \cdot \sum_{i=1}^{M} a_i P(X/k_i) \cdot H^{-1}(X-X_i) + \sum_{i=1}^{M} a_i P(X/k_i) \cdot \frac{1}{M}\sum_{i=1}^{M} P(X/k_i) \cdot H^{-1}(X-X_i)\right]_{X=X_0} \quad (117)$$

N is normalized to be a unit vector $$N = \frac{N}{|N|} \quad (118)$$

Referencing FIG. 10, in step 100 the normal vectors to the decision boundary, calculated in step 98, are averaged to estimate the effective decision boundary feature matrix, $M_{EDBFM}$, where $$M_{EDBFM} = \frac{1}{L}\sum_{i=1}^{L} N_i N_i^T \quad (119)$$

where L is the number of normal vectors calculated in step 98.

Referencing FIG. 10, in step 102 the eigenvalues, eigenvectors, and the rank of the effective decision boundary matrix, $M_{EDBFM}$ are calculated. The square matrix $M_{EDBFM}$, is evaluated to find d orthogonal eigenvectors $v$ and associated eigenvalues $\lambda$, that satisfy the relation $$M_{EDBF} \cdot v = \lambda \cdot v \quad (120)$$

where d is the number of dimensions of the original space.

The eigenvectors of $M_{EDBFM}$ provide the feature extraction vectors. The eigenvalues of $M_{EDBFM}$ provide an indication of the amount of discrimination provided by the eigenvectors. The eigenvalues of $M_{EDBFM}$ are a vector $$\Lambda = \begin{bmatrix} \lambda_1 \\ \vdots \\ \lambda_d \end{bmatrix} \quad (121)$$

and the eigenvectors of $M_{EDBFM}$ are a matrix $$V = \begin{bmatrix} v_{1,1} & \cdots & v_{d,1} \\ \vdots & \ddots & \vdots \\ v_{1,d} & \cdots & v_{d,d} \end{bmatrix} \quad (122)$$

The rank of $M_{EDBFM}$ is defined as the order of the highest order non-vanishing determinant within the $M_{EDBFM}$ matrix. The rank of $M_{EDBFM}$ is also the smallest dimension where the same classification can be obtained as in the original space.

On-Line Processing—Second Embodiment—FIG. 9

With reference to FIG. 9, the on-line processing begins with step 86 where the rank of the effective decision boundary matrix, $M_{EDBFM}$ is examined to determine the number of features to be extracted from the input-data-set measurements. If the rank of $M_{EDBFM}$ is less than the number of dimensions in the original space, eigenvectors with near-zero eigenvalues are removed from the eigenvector matrix of $M_{EDBFM}$ to define a new eigenvector matrix $V_R$ with reduce number of columns or $$V_R = \begin{bmatrix} v_{1,1} & \cdots & v_{R,1} \\ \vdots & \ddots & \vdots \\ v_{1,d} & \cdots & v_{R,d} \end{bmatrix} \quad (123)$$

where R is the number of eigenvectors in the reduced matrix $V_R$.

The number of columns in matrix $V_R$ is normally equal to the rank of $M_{EDBFM}$. However if further feature reduction is desired, those eigenvectors with eigenvalues lower than some predetermined threshold can be removed from $V_R$ to further reduce dimensionality.

Again with reference to FIG. 9, in step 88, the measurement vectors from the input-data-set are processed to provide a new measurement vector Y with reduce dimensionality where $$Y = V_R^T \cdot X \quad (124)$$

In eq. (124), Y is the reduced dimension measurement vector, $V_R$ is the reduced matrix of eigenvectors, and X is a measurement vector from the input-data-set.

Tests with Simulated Data

The performance of the adaptive feature algorithm is evaluated using polynomial and Parzen kernel approximations of the adaptive Bayes decision boundary. Both Adaptive Bayes Feature Extraction algorithms were evaluated on four test cases using data generated with known statistics and assuming Gaussian distributions. All of the examples use two dimensional data. Normally distributed simulated data was generated using these generating statistics with two hundred fifty samples generated for each class, the class-of-interest and class-other. The two data sets were combined to provide five hundred unlabeled samples for use training the Adaptive Bayes Feature Extraction algorithms.

In each test case, the eigenvalues and eigenvectors extracted by the Adaptive Bayes Feature Extraction algorithms are estimated using only labeled data from the class-of-interest and unlabeled data from the two classes. The a priori probabilities of the class-of-interest and the other class are assumed to be known.

In these test cases, Adaptive Bayes Feature Extraction using a least squares polynomial approximation of adaptive Bayes decision boundary was accomplished using a second order polynomial. Adaptive Bayes Feature Extraction using a least squares Parzen kernel approximation of adaptive Bayes decision boundary was accomplished using twenty Parzen kernels.

To evaluate feature extraction algorithm performance, discriminant vectors (eigenvectors) are estimated using the Adaptive Bayes Feature Extraction algorithms and used to transform the input data set from the original d-dimensions to a lower dimension. Labels are then applied to the transformed data and a Gaussian maximum likelihood classifier is used to classify the data. The same data is used for both training and test.

For comparison purposes, the Gaussian maximum likelihood classifier is also used to evaluate the classification accuracies obtainable using various combinations of the original features. Using an Exhaustive Search Feature Selection procedure, all combinations of the original features were evaluated and the combination providing the best classification accuracy was noted. In these examples, the classification accuracies shown from the Exhaustive search Feature Selection procedure are the classification accuracies provided by the best single feature, and the best two features.

Test Case One Results

Test case one results are shown in FIGS. 11A to 11D.

FIG. 11D shows the generating statistics for two classes, the class-of-interest and class-other.

Figure 11A:
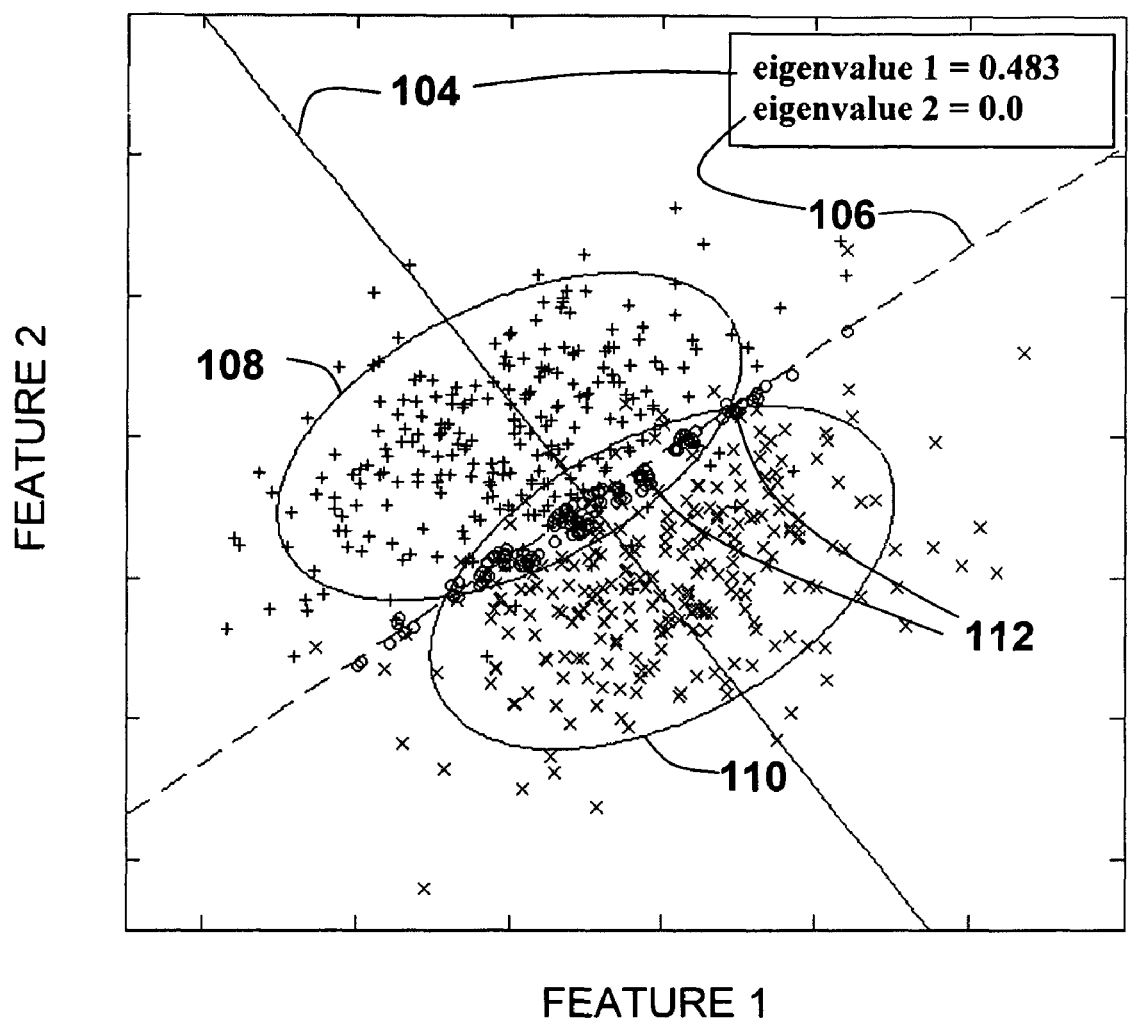

FIG. 11A shows a plot of the Adaptive Bayes Feature Extraction results using a least squares polynomial approximation of adaptive Bayes decision boundary. Two standard deviation error ellipses are plotted for the two distributions, the class-of-interest 108 and class-other 110. Also displayed are points 112 along the decision boundary found numerically by the feature extraction procedure. These points were used to calculate the normals to the decision boundary. In FIG. 11A, the two feature directions, 104 and 106, (eigenvectors) extracted by the feature extraction algorithm are plotted on the graph and their eigenvalues listed.

Figure 11B:
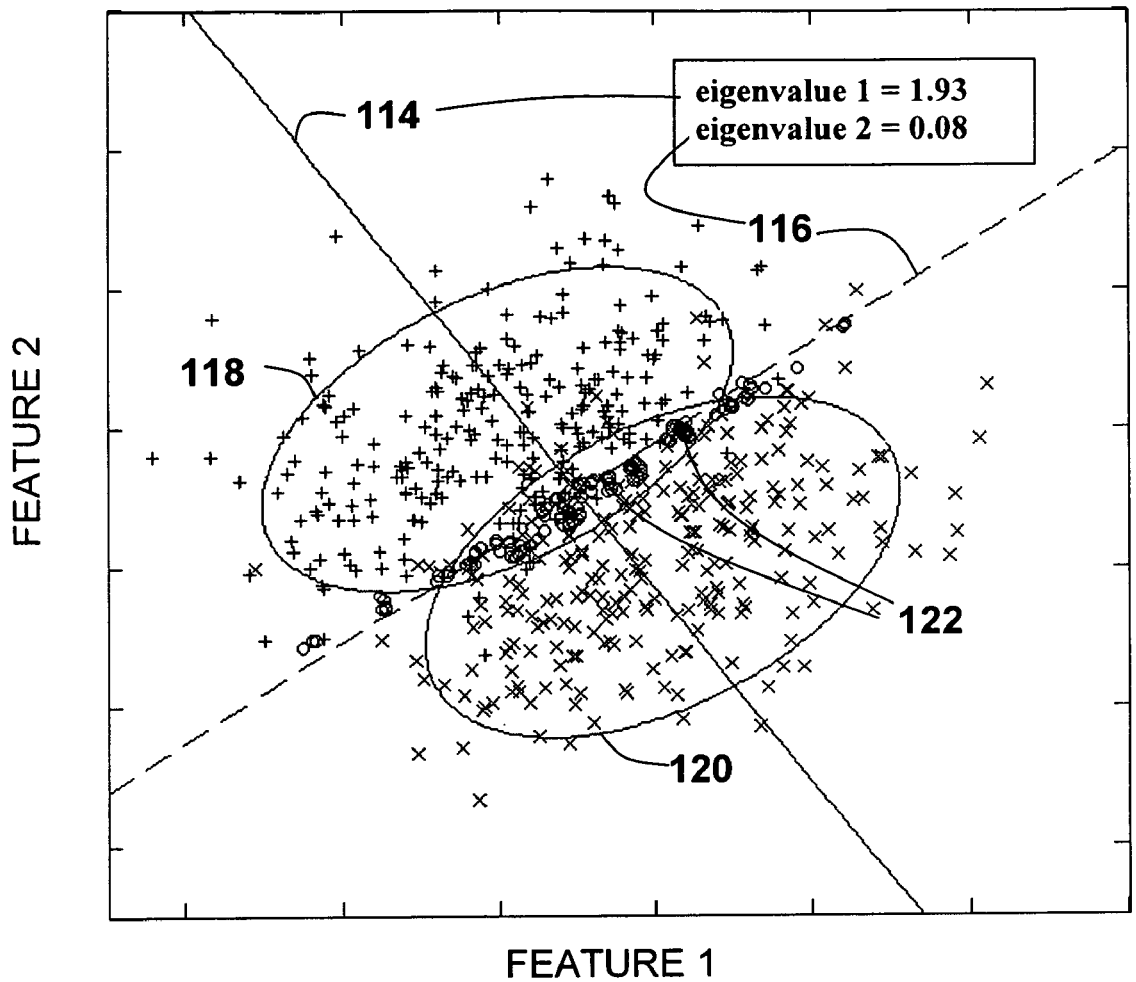

FIG. 11B shows a plot of the Adaptive Bayes Feature Extraction results using a least squares Parzen kernel approximation of adaptive Bayes decision boundary. Again, two standard deviation error ellipses are plotted for the two distributions, the class-of-interest 118 and the class-other 120. Also displayed are points 122 along the decision boundary found numerically by the feature extraction procedure. These points were used to calculate the normals to the decision boundary. The two feature directions, 114 and 116, (eigenvectors) extracted by the feature extraction algorithm are plotted on the graph and their eigenvalues listed.

In the examples shown in FIGS. 11A and 11B, the covariance matrices of the two distributions are equal and the expected decision boundary is a linear function. In both FIGS. 11A and 11B, it can be seen that the eigenvalues for eigenvector 1, 104 and 114, are significantly larger than the eigenvalues for eigenvector 2, 106 and 116, therefore it can be said that the rank of $M_{EDBFM}$ is 1. That indicates that eigenvector 1, 104 and 114, provides all of the discrimination between the two classes. Only one eigenvector is needed to achieve the same classification accuracy as in the original space—which is the correct number of features. This is confirmed by the classification results in FIG. 11C which shows that feature 1 (eigenvector 1, 104 and 114,) provides the same classification accuracy as that obtained in the original space using two features.

Test Case Two Results

Test case two results are shown in FIGS. 12A to 12D.

FIG. 12D shows the generating statistics for two classes, the class-of-interest and class-other.

Figure 12A:
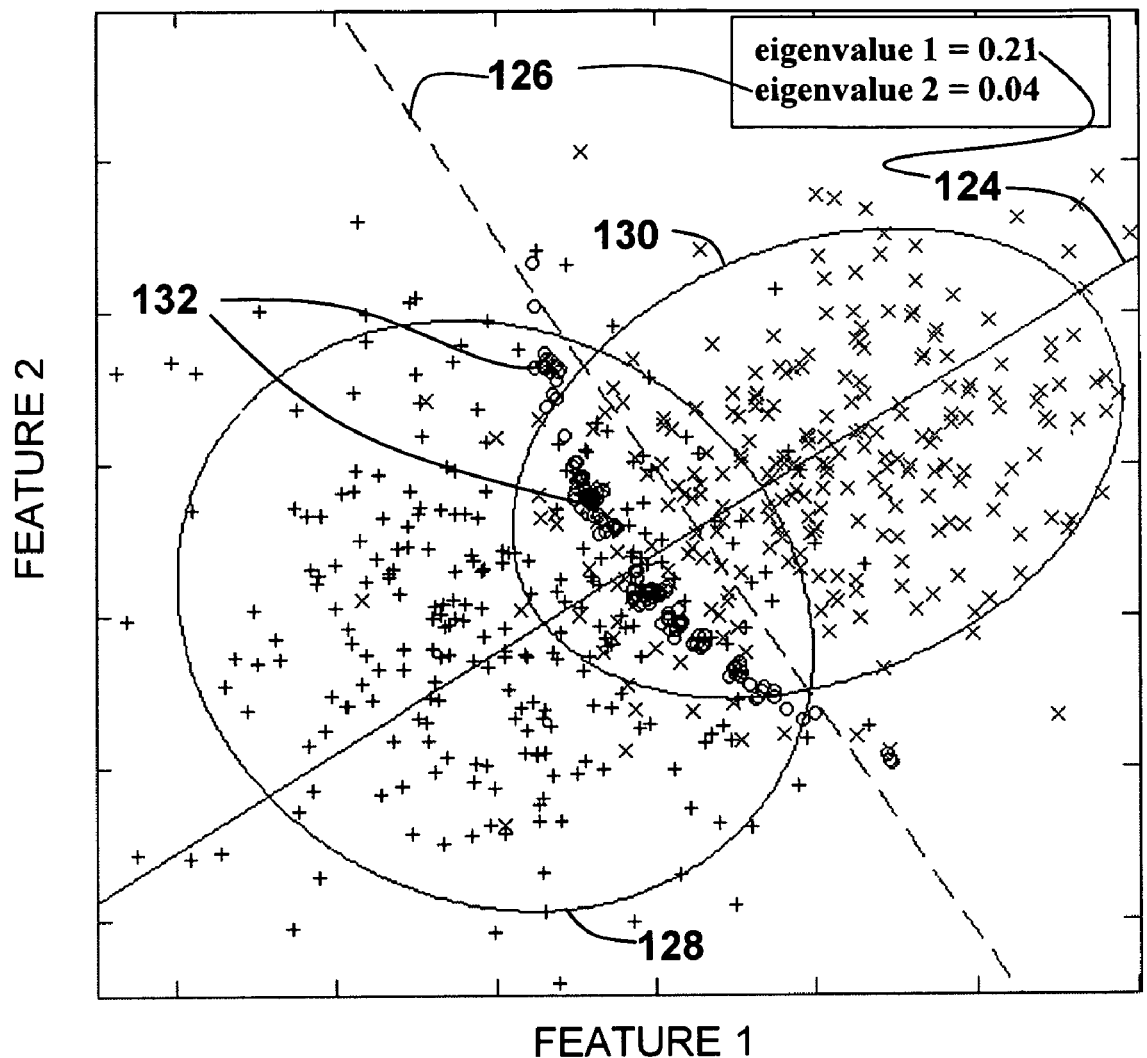

FIG. 12A shows a plot of the Adaptive Bayes Feature Extraction results using a least squares polynomial approximation of adaptive Bayes decision boundary. Two standard deviation error ellipses are plotted for the two distributions, the class-of-interest 128 and class-other 130. Also displayed are points 132 along the decision boundary found numerically by the feature extraction procedure. These points were used to calculate the normals to the decision boundary. In FIG. 12A, the two feature directions, 124 and 126, (eigenvectors) extracted by the feature extraction algorithm are plotted on the graph and their eigenvalues listed.

Figure 12B:
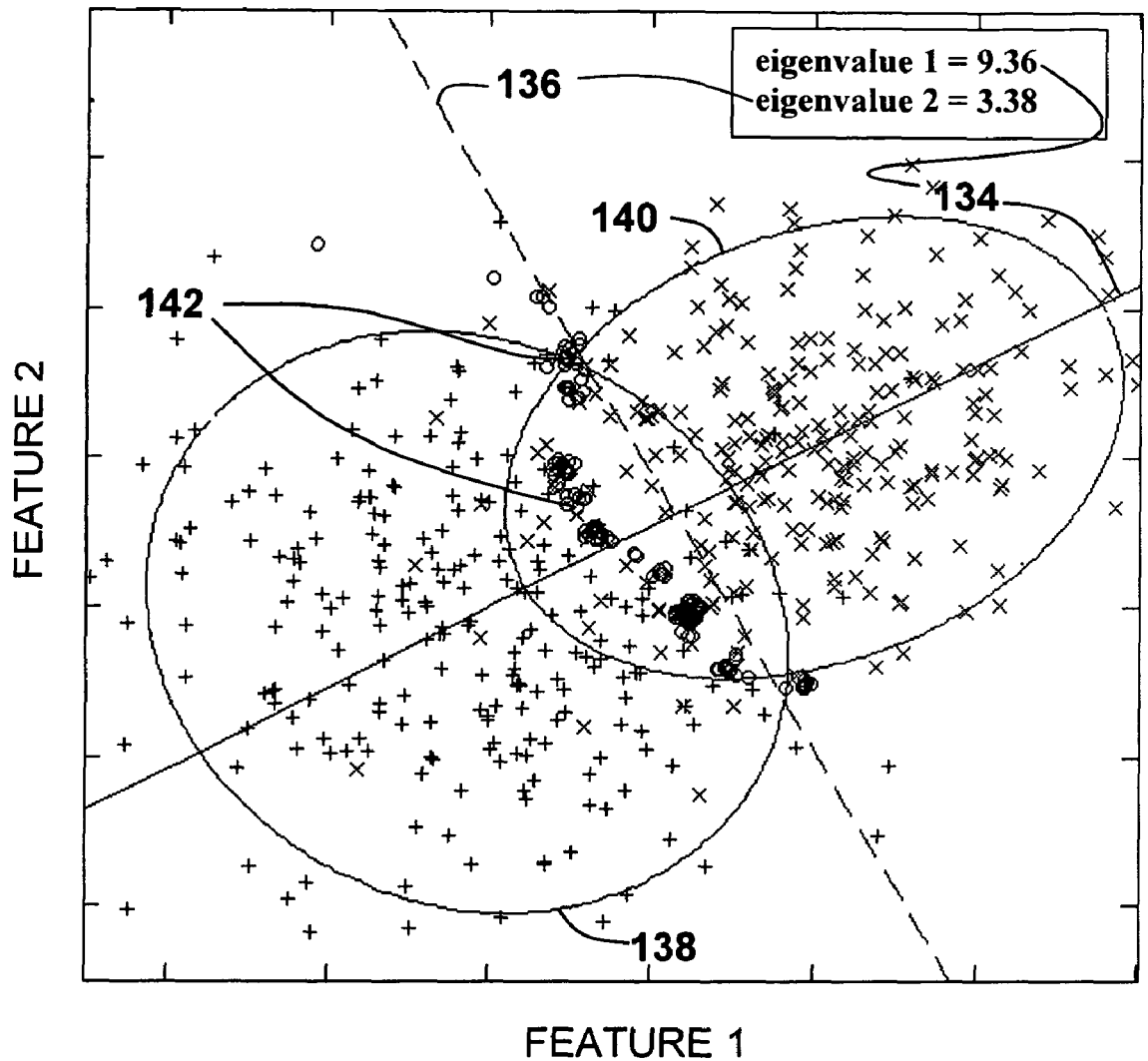

FIG. 12B shows a plot of the Adaptive Bayes Feature Extraction results using a least squares Parzen kernel approximation of adaptive Bayes decision boundary. Again, two standard deviation error ellipses are plotted for the two distributions, the class-of-interest 138 and the class-other 140. Also displayed are points 142 along the decision boundary found numerically by the feature extraction procedure. These points were used to calculate the normals to the decision boundary. The two feature directions, 134 and 136, (eigenvectors) extracted by the feature extraction algorithm are plotted on the graph and their eigenvalues listed.

In the examples shown in FIGS. 12A and 12B, the covariance matrices of the two distributions are unequal and the expected decision boundary is a quadratic function. In both FIGS. 12A and 12B, it can be seen that the eigenvalues for eigenvector 1, 124 and 134, are not significantly larger than the eigenvalues for eigenvector 2, 126 and 136, therefore it can be said that the rank of $M_{EDBFM}$ is 2. That indicates that two eigenvectors are required to discriminate between the two classes—which is the correct number of features. This is confirmed by the classification results in FIG. 12C which shows that two features (eigenvectors) are required to achieve the same classification accuracy as that obtained in the original space using two features. However, FIG. 12C also shows that both Adaptive Bayes Feature Extraction algorithms provided better classification accuracy than the Exhaustive Search procedure for feature 1.

Test Case Three Results

Test case three results are shown in FIGS. 13A to 13D.

FIG. 13D shows the generating statistics for two classes, the class-of-interest and class-other.

FIG. 13A shows a plot of the Adaptive Bayes Feature Extraction results using a least squares polynomial approximation of adaptive Bayes decision boundary. Two standard deviation error ellipses are plotted for the two distributions, the class-of-interest 148 and class-other 150. Also displayed are points 152 along the decision boundary found numerically by the feature extraction procedure. These points were used to calculate the normals to the decision boundary. In FIG. 13A, the two feature directions, 144 and 146, (eigenvectors) extracted by the feature extraction algorithm are plotted on the graph and their eigenvalues listed.

FIG. 13B shows a plot of the Adaptive Bayes Feature Extraction results using a least squares Parzen kernel approximation of adaptive Bayes decision boundary. Again, two standard deviation error ellipses are plotted for the two distributions, the class-of-interest 158 and the class-other 160. Also displayed are points 162 along the decision boundary found numerically by the feature extraction procedure. These points were used to calculate the normals to the decision boundary. The two feature directions, 154 and 156, (eigenvectors) extracted by the feature extraction algorithm are plotted on the graph and their eigenvalues listed.

In the examples shown in FIGS. 13A and 13B, it can be seen that the decision boundary consist of two parallel linear decision boundaries, as would be expected for these distributions. In both FIGS. 13A and 13B, it can be seen that the eigenvalues for eigenvector 1, 144 and 154, are significantly larger than the eigenvalues for eigenvector 2, 146 and 156, therefore it can be said that the rank of $M_{EDBFMi}$ is 1. That indicates that eigenvector 1, 144 and 154, provides all of the discrimination between the two classes. Only one eigenvector is needed to achieve the same classification accuracy as in the original space—which is the correct number of features. This is confirmed by the classification results in FIG. 13C which shows that feature 1 (eigenvector 1, 144 and 154,) provides the same classification accuracy as that obtained in the original space using two features.

Test Case Four Results

Test case four results are shown in FIGS. 14A to 14D.

FIG. 14D shows the generating statistics for two classes, the class-of-interest and class-other.

FIG. 14A shows a plot of the Adaptive Bayes Feature Extraction results using a least squares polynomial approximation of adaptive Bayes decision boundary. Two standard deviation error ellipses are plotted for the two distributions, the class-of-interest 168 and class-other 170. Also displayed are points 172 along the decision boundary found numerically by the feature extraction procedure. These points were used to calculate the normals to the decision boundary. In FIG. 14A, the two feature directions, 164 and 166, (eigenvectors) extracted by the feature extraction algorithm are plotted on the graph and their eigenvalues listed.

FIG. 14B shows a plot of the Adaptive Bayes Feature Extraction results using a least squares Parzen kernel approximation of adaptive Bayes decision boundary. Again, two standard deviation error ellipses are plotted for the two distributions, the class-of-interest 178 and the class-other 180. Also displayed are points 182 along the decision boundary found numerically by the feature extraction procedure. These points were used to calculate the normals to the decision boundary. The two feature directions, 174 and 176, (eigenvectors) extracted by the feature extraction algorithm are plotted on the graph and their eigenvalues listed.

In the examples shown in FIGS. 14A and 14B, it can be seen that the decision boundary consists of approximately two parallel linear decision boundaries, as would be expected for these distributions. In both FIGS. 14A and 14B, it can be seen that the eigenvalues for eigenvector 1, 164 and 174, are significantly larger than the eigenvalue for eigenvector 2, 166 and 176, therefore it can be said that the rank of $M_{EDBFMi}$ is 1. That indicates that eigenvector 1, 164 and 174, provides all of the discrimination between the two classes. Only one eigenvector is needed to achieve the same classification accuracy as in the original space—which is the correct number of features. This is confirmed by the classification results in FIG. 14C which shows that feature 1 (eigenvector 1, 164 and 174,) provides almost the same classification accuracy as that obtained in the original space using two features.

Summary of Test Results

These four test cases show that Adaptive Bayes Feature Extraction can successfully extract useful discriminant features using only labeled samples from the class-of-interest and unlabeled samples from the data set to be classified. The performances of the two Adaptive Feature Extraction algorithms using least squares adaptive Bayes classifiers were shown to be equal to or better than the performance of to the fully supervised Exhaustive Search Feature Selection procedure.

Conclustions, Ramifications, and Scope—FIG. 15

Feature extraction is normally performed in an environment where training samples, or otherwise, are available for all classes. Accordingly the reader will see that the Adaptive Bayes Feature Extraction system can be used in many real world applications where class definitions, through training samples or otherwise, are provided a priori only for the classes-of-interest. The distribution of the other-class may be 1) unknown, 2) may have changed 3) may be inaccurate due to insufficient numbers of samples used to estimate the distribution of the other-class, or 4) the cost of obtaining labeling samples, for purposes of defining all the classes in a given data set, by collecting ground truth or otherwise, may be very expensive or impossible to obtain. Often one is only interested in extracting features for one class or a small number of classes.

FIG. 15 shows a pattern recognition system architecture 184 that exploits the capabilities provided by the Adaptive Bayes Feature Extraction system and method in pattern recognition applications. As shown in FIG. 15, the features extracted by the Adaptive Bayes Feature Extraction module 186 are utilized by an Adaptive Bayes Pattern Recognition module 188 to classify unlabeled patterns from an input-data-set and recognize patterns from a class-of-interest. The Adaptive Bayes Pattern Recognition module 188 is implemented utilizing the adaptive Bayes decision rule, eq. (9), and classifies input patterns using the reduced features set provided by the Adaptive Bayes Feature Extraction module 186. The Adaptive Bayes Pattern Recognition module 188 approximates the class-of-interest posterior distribution function, $\hat{P}(C_{int}/X)$ in eq. (9), utilizing the least squares estimator, (eqs. (11) to (30)), and either a polynomial approximation of $\hat{P}(C_{int}/X)$, (eqs. (31) to (34)) or a Parzen kernel estimator of $\hat{P}(C_{int}/X)$ (eqs. (35) to (43)).

Examples where the capabilities of the Adaptive Bayes Feature Extraction system would be potentially very beneficial can be found in Home Land Security, remote sensing, and target recognition.

Of particular interest since 9/11 are biometrics [A. K. Jain, "Biometrics: A Grand Challenge", Proceeding of the $17^{th}$ International Conference on Pattern Recognition, (ICPR'04)] which involves identification of people based on distinctive personal traits (such as facial characteristics, fingerprints, iris patterns, speech patterns) and screening/monitoring of people in public places for persons of interest. In the USA Patriot Act and the Enhanced Border Security and Visa Entry Reform Act of 2002, the U.S. Congress mandated the use of biometrics in U.S. visas [NIST report to the United States Congress, "Summary of NIST Standards for Biometric Accuracy, Tamper Resistance, and Interoperability." Available at ftp://sequoyah.nist.gov/pub/nist_internal_reports/ NISTAPP_Nov02.pdf, November 2002]. This law requires that Embassies and Consulates abroad must now issue to international visitors, "only machine-readable, tamper-resistant visas and other travel and entry documents that use biometric identifiers". Congress also mandated the development of technology that uses these biometric identifiers to positively identify person entering the United States. When verifying a person's identity using biometric identifiers, typically, no a priori knowledge is available of other persons that might be attempting entry using someone else's entry documents. Selecting relevant features for use in verifying people's identity using biometric information can reduce identification processing time and possibly improve identification accuracy.

In addition, Home Land Security has a need for security screening and surveillance in public spaces to determine the presents of people on a watch-list using facial biometrics [A. K. Jain, "Biometrics: A Grand Challenge", Proceeding of the $17^{th}$ International Conference on Pattern Recognition, (ICPR'04)]. The screening watch-list typically consists of pictures of a few hundred persons. Many potential features can be generated that might be useful in recognizing people on the watch list. Normally, no a priori knowledge is available of the identities on the other persons observed in the public space that might be miss-identified with people on the watch-list. Selecting relevant features for use in identifying people on the watch list can reduce identification processing time and possibly improve classification accuracy.

In remote sensing applications, ground truth maps, providing prior information on all land cover typologies in an image, do not really describe all the types of land cover types in the image [P. Mantero, "Partially supervised classification of remote sensing images using SVM-based probability density estimation", IEEE Transactions on Geoscience and Remote Sensing, vol. 43, no. 3, March 2005, pp. 559-570]. In addition, one is often interested in identifying picture elements (pixels) belonging to only one or a small number of classes. Generation of a complete training set for all the land cover types in an image is time-consuming, difficult, and expensive. Remotely sensed images typically contain large numbers of pixels elements with each pixel containing many spectral measurements. Extracting relevant features can significantly reduce image processing time and can improve classification accuracy.

Target recognition applications [B. Eckstein, "Evaluating the Benefits of assisted Target Recognition", Proceeding of the $30^{th}$ Applied Imagery Pattern recognition Workshop (AIPR"01)], [S. Rizvi, "Fusion Techniques for Automatic Target Recognition", Proceedings of the $32^{nd}$ Applied Imagery Pattern Recognition Workshop (AIPR'03)] often involves recognition of high valued mobile military targets such as tanks in imagery data collected in real time. Often no prior knowledge is available of the other objects in the image which might be confused with a tank, such as decoys (anything that mimics a target but is not a real target), background clutter, man-made structures, and civilian vehicles. The features most relevant for discriminating between the target and other objects in an image are usually not known a priori. Extracting relevant features can reduce processing time and can improve classification accuracy.

In each of these applications there is a set of labeled training data from the class-of-interest (biometric information in an entry document, pictures of persons on a watch-list, land cover types, or high valued military targets). The input-data-set consists of unlabeled measurement vectors from a data set to be classified. The Adaptive Bayes Feature Extraction system is capable of extracting optimal features from these streams of unlabeled measurement vectors that provide optimal discrimination between two classes, the class-of-interest and the class-other.

Additional advantages of the Adaptive Bayes Feature Extraction system are:

The features extracted minimum classification error. The features extracted are directly related to the Bayes decision boundary. It is well known that in supervised classification problems, the probability of error due to a Bayes classifier is the best that can be achieved.

The method is adaptive in the sense that the features extracted provide optimal discrimination between class-of-interest and any unknown class-other which may exist in the data set to be classified. If another input-data-set is processed, the features extracted will likely change (adapt) to accommodate changes in the unknown class-other.

The method is a nonparametric which means no a priori knowledge is required of the distributions of the class-of-interest and the other-class.

The Parzen kernel embodiment of the Adaptive Bayes Feature Extraction method can process high dimension measurement vectors with only a small increase in the number of computations and with reduced risk of introducing numerical errors in the feature extraction process.

While my above description contains many specificities, these should not be construed as limitations on the scope of the invention, but rather as an exemplification of the presently preferred embodiments. The scope of the embodiment should be determined by appended claims and their legal equivalents, rather than by the examples given.

I claim:

1. A computer-implemented method for extracting discriminately informative features from input patterns, which provide discrimination between two classes, a class-of-interest and a class-other, while reducing the number of features, comprising the steps of:
   receiving a training set of class-of-interest patterns, a set of unlabeled patterns from an input-data-set, and an estimate of a class-of-interest a priori probability in said input-data-set, said input-data-set being at least one of an image, video or speech data set;
   selecting elements of a predetermined polynomial function;
   executing a training stage using said class-of-interest a priori probability, said training set of class-of-interest patterns, and said unlabeled patterns from said input-data-set, said training stage including a step of selecting a set of weights for said polynomial function that ensure a least squares approximation of a class-of-interest posterior distribution function using said polynomial function;
   classifying said pattern from said input-data-set as being either said class-of-interest or said class-other in accordance with a conditional test defined by an adaptive Bayes decision rule;
   extracting a predetermined percent of said classified patterns that lie near a decision boundary;
   locating points lying on said decision boundary using said extracted patterns that lie near said decision boundary;
   calculating normal vectors to said decision boundary using said points lying on said decision boundary;
   calculating an effective decision boundary feature matrix;
   calculating eigenvalues, eigenvectors, and a rank of said effective decision boundary feature matrix;
   selecting a set of said eigenvectors for use in a feature extraction matrix; and
   extracting a reduced set of features using said feature extraction matrix,
   whereby said discriminately informative features are extracted from input patterns which provide discrimination between a class-of-interest and a class-other while reducing the number of features, using only said training set of class-of-interest patterns, and said unlabeled patterns from said input-data-set, and without any a priori knowledge of said class-other.

2. The method of claim 1 wherein said step of selecting the elements of a predetermined polynomial function includes the step of specifying the elements of a vector defining said polynomial function which is a function of the polynomial order and the measurements and has the form $$F(X) = (f(X)_1, f(X)_2, \ldots f(X)_n)^T$$

where $F(X)$ is as vector containing polynomial elements, $f(X)$, which are functions of the measurements.

3. The method of claim 1 wherein said step of selecting said set of weights for said polynomial function elements includes a step of estimating said set of weights using the expression $$A = P_{C_{int}} \left[ \frac{1}{N} \sum_{i=1}^{N} (F(X_i) F(X_i)^T) \right]^{-1} \cdot \frac{1}{M} \sum_{j=1}^{M} [F(X_j(C_{int}))]$$

where $A = (a_1, a_2, \ldots a_R)^T$ is a vector of estimated said weights for said polynomial elements.

4. The method of claim 1 wherein said step of classifying said pattern from said input-data-set as being said class-of-interest or said class-other includes a step of estimating a value for said class-of-interest posterior probability, $\hat{P}(C_{int}/X)$, for said pattern using the expression $$\hat{P}(C_{int}/X) \cong A^T F(X)$$

where $F(X)$ is said vector containing functions of the measurements as defined by said polynomial elements $$F(X) = (f(X)_1, f(X)_2, \ldots f(X)_n)^T$$

and A is a vector of weights for the $f(X)$'s $$A = (a_1, a_2, \ldots a_n)^T$$

and $A^T F(X)$ is the said estimated value of said class-of-interest posterior probability, $\hat{P}(C_{int}/X)$.

5. The method of claim 1 wherein said step of classifying said pattern from said input-data-set includes a step of assigning said pattern to either said class-of-interest or said class-other based on said value of said class-of-interest posterior probability, $\hat{P}(C_{int}/X)$, and a conditional test defined by said adaptive Bayes decision rule, as defined in the following expression If: $A^T F(X) \geq \frac{1}{2}$, Classify X as the class-of-interest
Otherwise, classify X as class-other
where $A^T F(X)$ is the said estimated value of said class-of-interest posterior probability, $\hat{P}(C_{int}/X)$.

6. The method of claim 1 wherein said step of extraction of said predetermined percent of said patterns that lie near the said decision boundary includes a step of selection of patterns lying near the decision boundary using the following criterion If $|A^T F(X) - \frac{1}{2}| < t$, Identify "X" as laying "near" the decision boundary
where the threshold "t" is selected using a means that ensures that a predetermined percent of samples near the decision boundary are identified.

7. The method of claim 1 wherein said step of location of said point lying on said decision boundary using said patterns that lie near said decision boundary includes a step of interpolating between points on opposite sides of the decision boundary using the following expressions $$X_0 = \mu V + V_0$$

where $$V_0 = X_{int}$$

$$V = X_{other} - X_{int}$$

where the point, $X_0$, lying on the decision boundary is found by incrementing $\mu$ above, to find the point where $$A^T F(X) - \frac{1}{2} = 0$$

8. The method of claim 1 wherein said step of calculation of said normal vectors to said decision boundary using said points lying on said decision boundary includes the step of calculating a unit normal vector to said decision boundary at each said decision boundary point $X_0$ using the gradient operator.

$$N = \nabla h(X) = \frac{\delta h(X)}{\delta X} = \begin{bmatrix} \frac{\delta h(X)}{\delta x_1} \\ \vdots \\ \frac{\delta h(X)}{\delta x_d} \end{bmatrix}_{X=X_0}$$

where $$h(X) = A^T F(X) - \frac{1}{2}$$

and the normal vector N is normalized to a unit vector using the expression $$N = \frac{N}{|N|}.$$

9. The method of claim 1 wherein said step of calculation of said effective decision boundary feature matrix, $M_{EDBFM}$, includes the step of estimation of $M_{EDBFM}$ using the expression $$M_{EDBFM} = \frac{1}{L}\sum_{i=1}^{L} N_i N_i^T$$

where L is the number of said normal vectors used in said calculation.

10. The method of claim 1 wherein said step of calculation of said eigenvalues, said eigenvectors, and said rank of said effective decision boundary feature matrix includes the step of evaluating the square matrix $M_{EDBFM}$, to find d orthogonal said eigenvectors v and associated said eigenvalues λ, that satisfy the relation $$M_{EDBF} \cdot v = \lambda \cdot v$$

where d is the number of dimensions of the original space and the rank of $M_{EDBFM}$ is the order of the highest order, non-vanishing determinant, within said $M_{EDBFM}$ matrix.

11. The method of claim 1 wherein said step of selection of a set of said eigenvectors for using in said feature extraction matrix includes the step of using a means to determine the number of features to be extracted from the input-data-set measurements where said means causes said eigenvectors with low said eigenvalues to be removed from said $M_{EDBFM}$ matrix to produce a new eigenvector matrix $V_R$ with reduce number of columns or $$V_R = \begin{bmatrix} v_{1,1} & \cdots & v_{R,1} \\ \vdots & \ddots & \vdots \\ v_{1,d} & \cdots & v_{R,d} \end{bmatrix}$$

where R is the number of said eigenvectors in the reduced feature extraction matrix $V_R$.

12. The method of claim 1 wherein said step of extraction of a reduce set of features using said reduced feature extraction matrix includes a step of processing said measurement vectors from said input-data-set to provide a new measurement vector Y with reduce dimensionality where $$Y = V_R^T \cdot X$$

where Y is said reduced dimension measurement vector, $V_R$ is said reduced matrix of eigenvectors, and X is a measurement vector from said input-data-set.

13. A computer-implemented method for extracting discriminately informative features from input patterns, which provide discrimination between a class-of-interest and a class-other while reducing the number of features, comprising the steps of:

receiving a training set of class-of-interest patterns, a set of unlabeled patterns from an input-data-set, and an estimate of a class-of-interest a priori probability in said input-data-set, said input-data-set being at least one of an image, video or speech data set;

selecting a predetermined number of Gaussian kernel densities functions;

selecting parameter values for said Gaussian kernel densities functions where said selected parameter values cause said Gaussian kernel densities to approximate the probability density function of said input-data-set;

executing a training stage using said a priori probability of said class-of-interest, said training set of class-of-interest patterns, and said unlabeled patterns from said input-data-set, said training stage including a step of least squares approximation of a class-of-interest posterior distribution function using a linear combination of weighted said Gaussian kernel density functions;

classifying said pattern from said input-data-set as being either said class-of-interest or said class-other in accordance with a conditional test defined by a adaptive Bayes decision rule;

extracting a predetermined percent of said classified patterns that lie near a decision boundary;

locating points lying on said decision boundary using said extracted patterns that lie near said decision boundary;

calculating normal vectors to said decision boundary using said points lying on said decision boundary;

calculating an effective decision boundary feature matrix;

calculating eigenvalues, eigenvectors, and rank of said effective decision boundary feature matrix;

selecting a set of eigenvectors for use in a feature extraction matrix; and extracting a reduced set of features using said feature extraction matrix, whereby said discriminately informative features are extracted from input patterns which provide discrimination between a class-of-interest and a class-other while reducing the number of features, using only said training set of class-of-interest patterns, and said unlabeled patterns from said input-data-set, and without any a priori knowledge of said class-other.

14. The method of claim 13 wherein said step of a means for selecting said parameter values for said Gaussian kernel densities functions includes a step of randomly selecting said predetermined number of said patterns from said input-data-set and setting the mean vector of each said Gaussian kernel density function equal to one of said selected patterns.

15. The method of claim 13 wherein said step of a means for selecting said parameter values for said Gaussian kernel densities functions includes a step of specifying a kernel smoothing parameter value for each said Gaussian kernel density function, with said kernel smoothing parameter value estimated using the following iterative equation $$\hat{H} = \sum_{j=1}^{N} \sum_{i=1}^{M} \frac{P_{k_i} \cdot P(X_j/k_i)}{P(X_j)} \cdot \left[\frac{1}{2}(X_j - X_i)(X_j - X_i)^T\right]$$

where $\hat{H}$ is the estimated value for said kernel smoothing parameter value.

16. The method of claim 13 wherein said step of executing said training stage includes a step of providing a plurality of said weights for each said Gaussian kernel density function.

17. The method of claim 16 wherein said step of providing a plurality of said weights for each said Gaussian kernel density function includes a step of providing a first weight for each said Gaussian kernel density function whose value is equal to the inverse of the probability of said pattern in said input-data-set.

18. The method of claim 16 wherein said step of providing a plurality of said weights for each said Gaussian kernel density function includes a step of providing a second weight for each said Gaussian kernel density function whose value is selected to ensure that said linear combination of weighted Gaussian kernel density functions approximates said class-of-interest posterior distribution function in a least squares sense using the expression $$A = P_{C_{int}} \left[\frac{1}{N}\sum_{i=1}^{N}(F(X_i)F(X_i)^T)\right]^{-1} \cdot \frac{1}{M}\sum_{j=1}^{M}[F(X_j(C_{int}))]$$

where $A=(a_1, a_2, \ldots a_R)^T$ is a vector of estimated values for said second weight.

19. The method of claim 13 wherein said step of classifying said pattern from said input-data-set as being said class-of-interest or said class-other includes a step of estimating a value for said class-of-interest posterior probability, $\hat{P}(C_{int}/X)$, for said pattern using the expression $$\hat{P}(C_{int}/X) \cong A^T F(X)$$

where $$A^T F(X) = a_1 \frac{P(X/k_1)}{P(X)} + a_2 \frac{P(X/k_2)}{P(X)} \ldots + a_R \frac{P(X/k_R)}{P(X)}$$

and $A^T F(X)$ is the said estimated value of said class-of-interest posterior probability, $\hat{P}(C_{int}/X)$.

20. The method of claim 13 wherein said step of classifying said pattern from said input-data-set includes a step of assigning said pattern to either said class-of-interest or said class-other based on said value of said class-of-interest posterior probability, $\hat{P}(C_{int}/X)$, and a conditional test defined by said adaptive Bayes decision rule, as defined in the following expression If: $A^T F(X) \geq \frac{1}{2}$, Classify X as the class-of-interest
Otherwise, classify X as class-other
where $A^T F(X)$ is the said estimated value of said class-of-interest posterior probability, $\hat{P}(C_{int}/X)$.

21. The method of claim 13 wherein said step of extraction of said predetermined percent of said patterns that lie near the said decision boundary includes a step of selection of said patterns lying near said decision boundary using the following criterion If $|A^T F(X) - \frac{1}{2}| < t$, Identify "X" as laying "near" the decision boundary
where the threshold "t" is selected using a means that ensures that a predetermined percent of samples near the decision boundary are selected.

22. The method of claim 13 wherein said step of location of said point lying on said decision boundary using said patterns that lie near said decision boundary includes a step of interpolating between said patterns lying on said opposite sides of said decision boundary using the following expressions $$X_0 = \mu V + V_0$$

where $$V_0 = X_{int}$$

$$V = X_{other} - X_{int}$$

where the point, $X_0$, lying on the decision boundary is found by incrementing $\mu$ above, to find the point where $$A^T F(X) - \frac{1}{2} = 0$$

23. The method of claim 13 wherein said step of calculation of said normal vectors to said decision boundary using said points lying on said decision boundary includes the step of calculating a unit normal vector to said decision boundary at each said decision boundary point $X_0$ using the following expression $$N = \frac{1}{P(X)^2}\left[-P(X) \cdot \sum_{i=1}^{M} a_i P(X/k_i) \cdot H^{-1}(X - X_i) + \sum_{i=1}^{M} a_i P(X/k_i) \cdot \frac{1}{M}\sum_{i=1}^{M} P(X/k_i) \cdot H^{-1}(X - X_i)\right]_{X = X_0}$$

and the normal vector N is normalized to a unit vector using the expression.

$$N = \frac{N}{|N|}.$$

24. The method of claim 13 wherein said step of calculation of said effective decision boundary feature matrix, $M_{EDBFM}$, includes the step of estimation of $M_{EDBFM}$ using the expression $$M_{EDBFM} = \frac{1}{L}\sum_{i=1}^{L} N_i N_i^T$$

where L is the number of normal vectors used in the calculation.

25. The method of claim 13 wherein said step of calculation of said eigenvalues, said eigenvectors, and said rank of said effective decision boundary feature matrix includes the step of evaluating the square matrix $M_{EDBFM}$, to find d orthogonal said eigenvectors v and associated said eigenvalues $\lambda$, that satisfy the relation $$M_{EDBF} \cdot v = \lambda \cdot v$$

where d is the number of dimensions of the original space and said rank of said $M_{EDBFM}$ matrix is the order of the highest order, non-vanishing determinant, within said $M_{EDBFM}$ matrix.

26. The method of claim 13 wherein said step of selection of a set of said eigenvectors for using in said feature extraction matrix includes the step of determining the number of said features to be extracted from said input-data-set measurements with said eigenvectors with low eigenvalues being removed from the eigenvector matrix of $M_{EDBFM}$ to produce a new eigenvector matrix $V_R$ with reduce number of columns or $$V_R = \begin{bmatrix} v_{1,1} & \cdots & v_{R,1} \\ \vdots & \ddots & \vdots \\ v_{1,d} & \cdots & v_{R,d} \end{bmatrix}$$

where R is the number of eigenvectors in the reduced matrix $V_R$.

27. The method of claim 13 wherein said step of extraction of a reduce set of features using said feature extraction matrix includes a step of processing said measurement vectors from the input-data-set to provide a new measurement vector Y with reduce dimensionality where $$Y = V_R^T \cdot X$$

where Y is said reduced dimension measurement vector, $V_R$ is said reduced matrix of eigenvectors, and X is a said measurement vector from said input-data-set.

\* \* \* \* \*